United States Patent
Ishii et al.

(10) Patent No.: US 6,801,198 B2
(45) Date of Patent: Oct. 5, 2004

(54) METHOD OF EDITING ASSEMBLY

(75) Inventors: Masanobu Ishii, Irvine, CA (US); Dmitry Leshchiner, Irvine, CA (US); Tony Weber, Santa Ana, CA (US)

(73) Assignee: Amada Company, Limited, Kanagawa (JP)

( * ) Notice: Subject to any disclaimer, the term of this patent is extended or adjusted under 35 U.S.C. 154(b) by 296 days.

(21) Appl. No.: 10/135,440

(22) Filed: May 1, 2002

(65) Prior Publication Data

US 2003/0208295 A1 Nov. 6, 2003

(51) Int. Cl.[7] .............................................. G06T 15/00
(52) U.S. Cl. .............................................................. 345/419
(58) Field of Search ............................ 345/418, 419, 345/642, 676, 678, 679, 680

(56) References Cited

U.S. PATENT DOCUMENTS 5,689,435 A * 11/1997 Umney et al. ................. 703/1
6,411,862 B1 * 6/2002 Hazama et al. ............. 700/182

OTHER PUBLICATIONS

Bush et al., Synthesis of Bent Sheet Metal Parts from Design Features, ACM May 1999, pp. 119–129.*

* cited by examiner

Primary Examiner—Phu K. Nguyen
(74) Attorney, Agent, or Firm—Greenblum & Bernstein, P.L.C.

(57) ABSTRACT

A method of editing an assembly with CAD includes selecting, through navigation, a first element of a first part among parts displayed on a CAD screen, the parts being made of sheet metal and being assembled into the assembly, the navigation automatically selecting an element of a part under a cursor as the cursor is moved on the CAD screen, dragging the first part including the first element with the cursor in one of horizontal and perpendicular directions relative to the first element, selecting, through navigation, a second element of a second part among the parts displayed on the CAD screen, and attaching the first element of the first part to the second element of the second part.

58 Claims, 34 Drawing Sheets

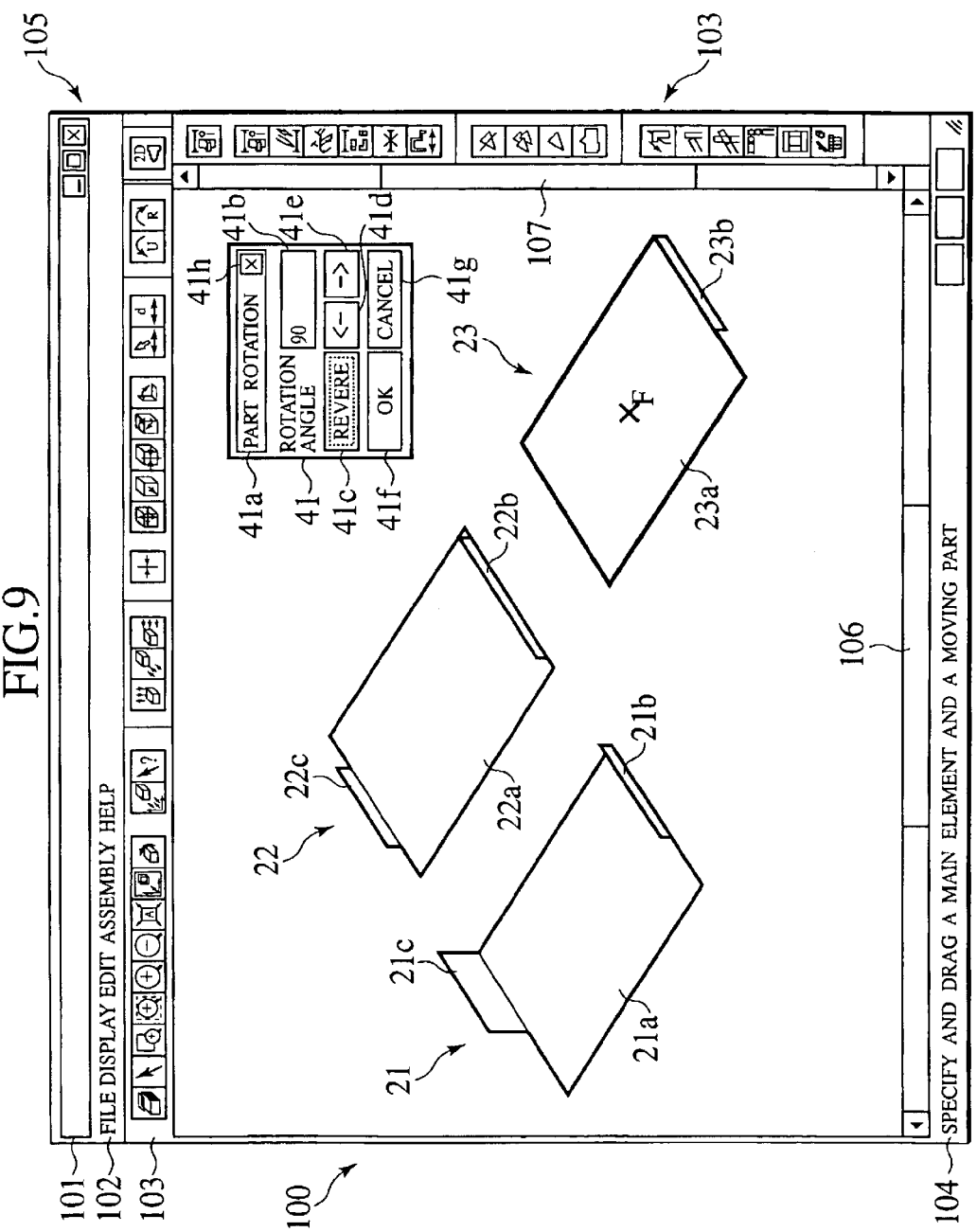

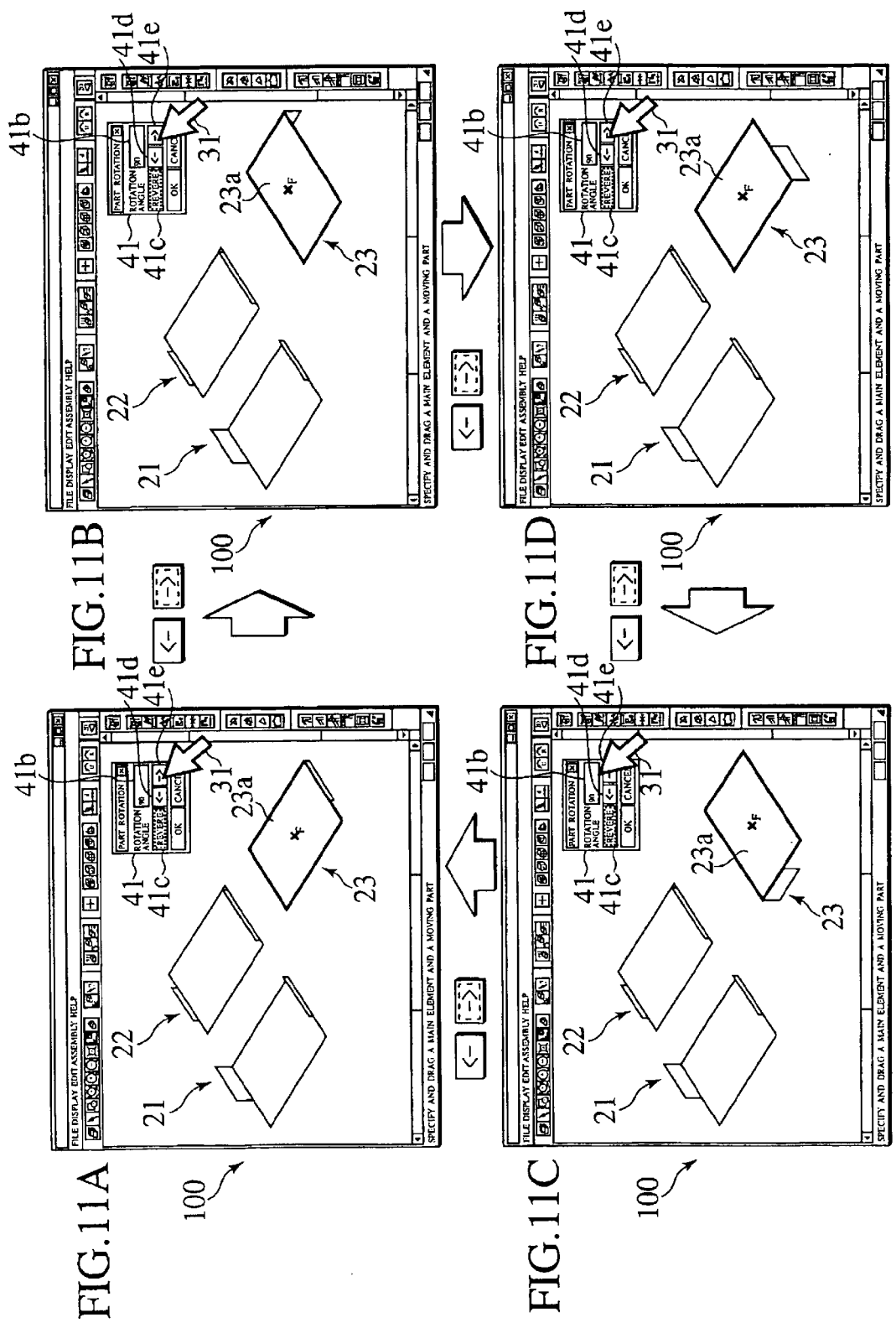

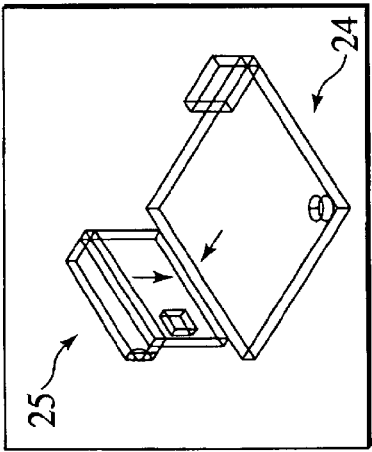
FIG.22A
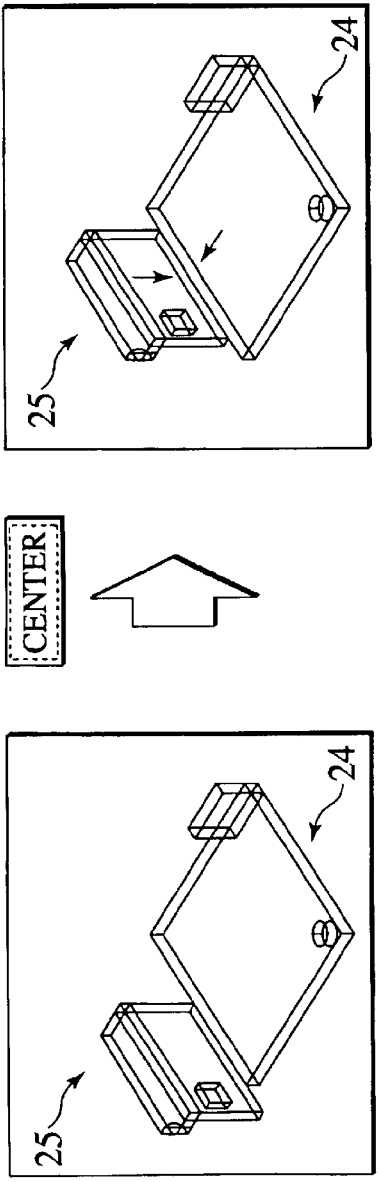
FIG.22B
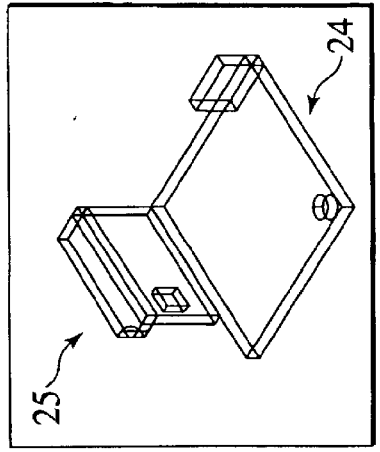
FIG.22C
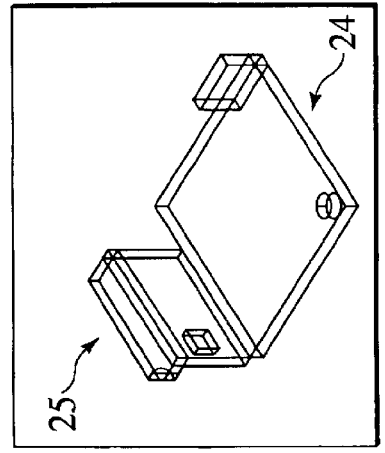
FIG.22D

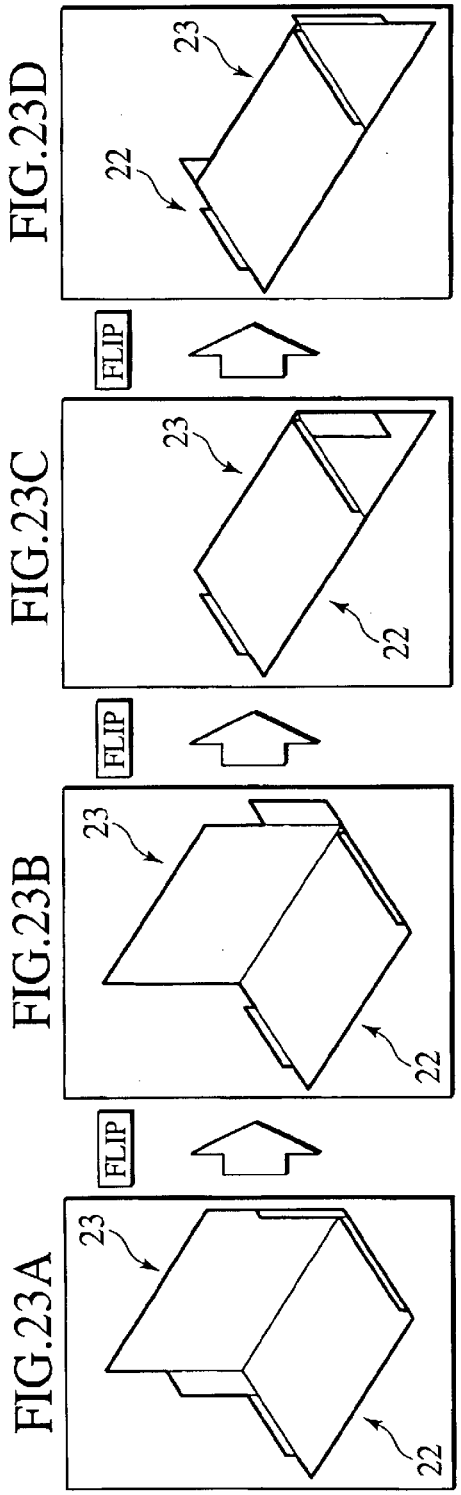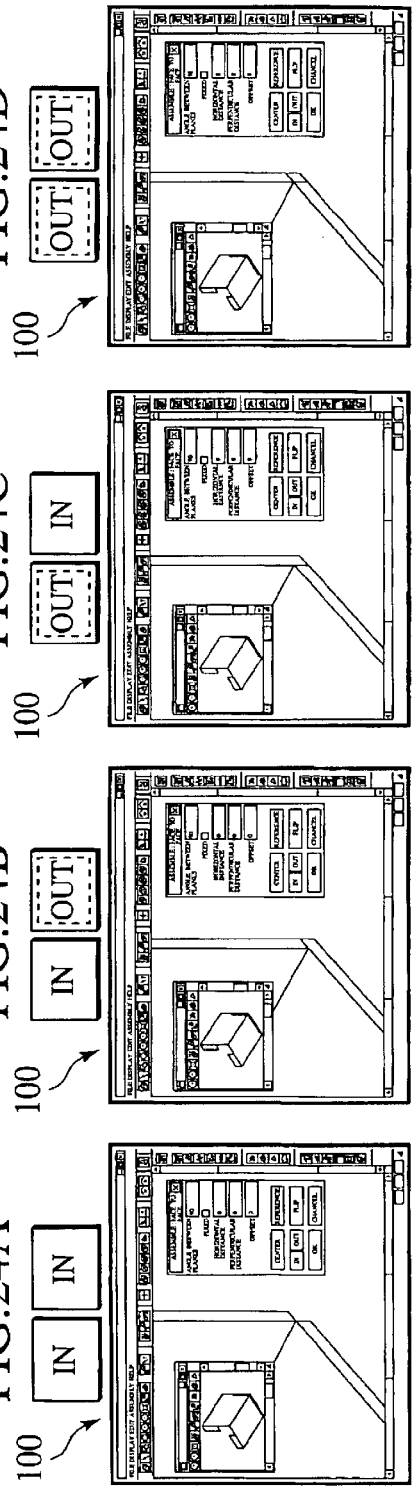

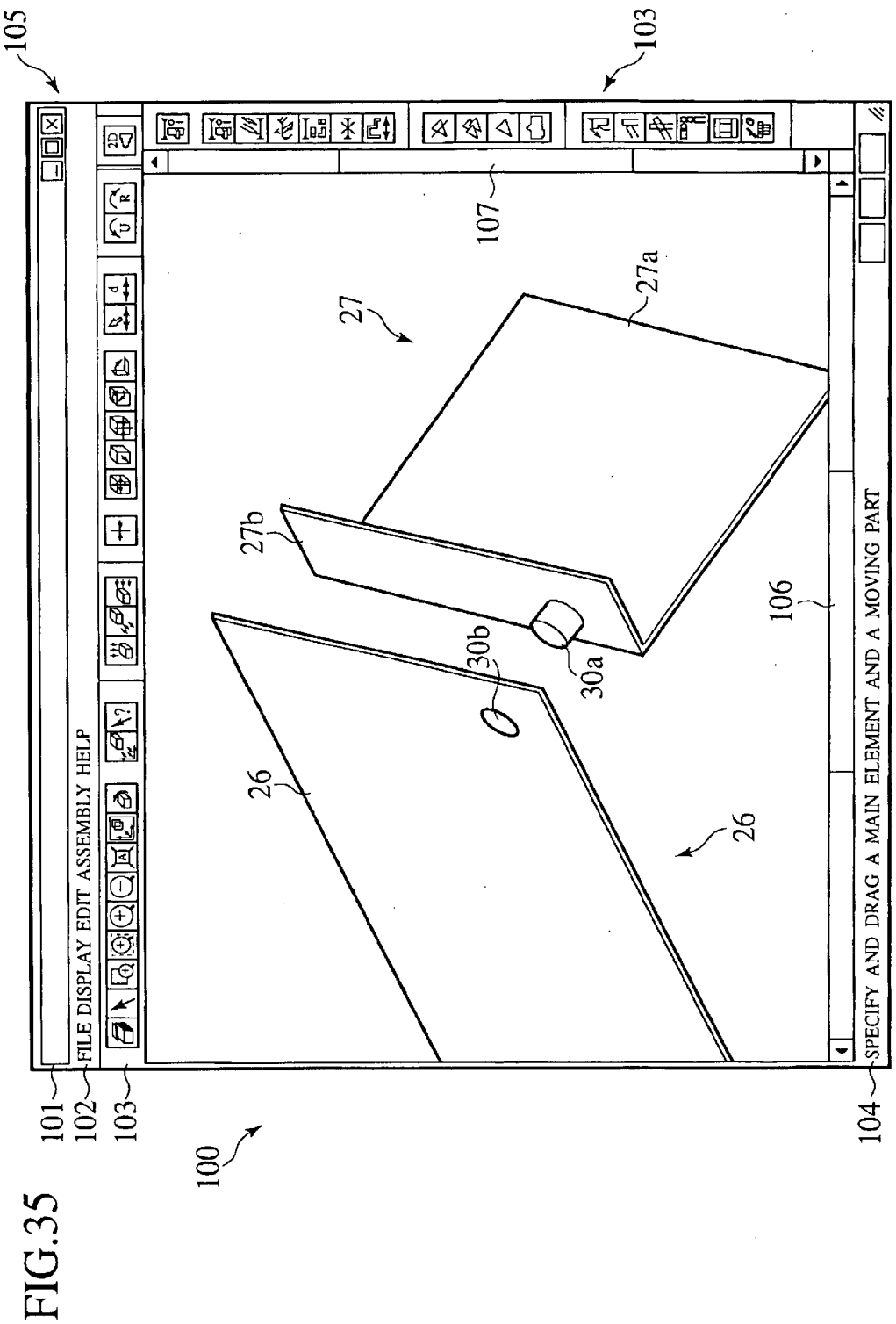

METHOD OF EDITING ASSEMBLY

BACKGROUND OF THE INVENTION

1. Field of the Invention

The present invention relates to a method of editing an assembly with CAD, and particularly, to a method of employing CAD to edit an assembly composed of sheet-metal parts.

2. Description of the Related Art

CAD enables designers to interactively design, for example assemblies each composed of a plurality of parts. Three-dimensional CAD is capable of editing an assembly composed of sheet-metal parts in a three-dimensional space.

The three-dimensional CAD handles an assembly as a data structure. The data structure includes data on parts that constitute the assembly and positional data of the parts.

Editing an assembly with CAD involves move and attach operations of parts of the assembly. The attach operation is carried out by specifying a reference element such as a point, line face, hole center, or the like on a moving part and a reference element on a target part and by spatially moving the moving part toward the target part, so that the reference element of the moving part may be attached to the reference element of the target part. Moving and combining parts in a three-dimensional space in CAD usually involve specifying a moving part and determining the quantities of spatial movement and rotation applied to the moving part.

Editing an assembly with CAD also involves a connection hole forming operation when connecting a part to another. This operation provides a part with a projection such as burring and the other part with a hole or a recess corresponding to the projection.

Editing an assembly with three-dimensional CAD is generally a complicated operation. For example, moving and attaching parts in a three-dimensional space in CAD require a special knowledge, and therefore, are not available for everybody.

SUMMARY OF THE INVENTION

The present invention provides a method of easily editing an assembly made of sheet-metal parts with CAD.

According to a first aspect of the present invention, a method of editing an assembly with CAD includes reading parts data defining parts that are made of sheet metal and are assembled into the assembly, reading attachment data defining attachment relationships among the parts, reading edit data defining edit states of the parts, reading assembling data defining an assembling sequence of the parts, and assembling the parts into the assembly according to the parts data, attachment data, edit data, and assembling data.

The first aspect reads parts data defining parts to be assembled into an assembly, attachment data defining attachment relationships among the parts, edit data defining edit states of the parts, and assembling data defining an assembling sequence of the parts. If there is a design or process change such as a change in metal thickness or welding process, the read data is referred to and is amended to provide a modified assembly.

According to the first aspect, the attachment data may include at least one of distance data, angle data, and connection data concerning the parts.

According to the first aspect the edit data may include at least one of connection-hole position data and connection-hole shape data concerning the parts.

According to the first aspect, the parts may include single parts and components each made of a plurality of single parts.

According to the first aspect, the assembling data may include data to assemble a component from single parts.

According to the first aspect, the method may include reading attribute data defining attributes of the parts, the attribute data, parts data, attachment data, edit data, and assembling data being used to assemble the parts into the assembly.

According to the first aspect, the attribute data may include data defining colors of the parts.

According to a second aspect of the present invention, a method of editing an assembly with CAD includes saving parts data defining parts that are made of sheet metal and are assembled into the assembly, saving attachment data defining attachment relationships among the parts, saving edit data defining edit states of the parts, and saving assembling data defining an assembling sequence of the parts.

The second aspect saves parts data, attachment data defining attachment relationships among the parts, edit data defining edit states of the parts, and assembling data defining an assembling sequence of the parts. If there is a design or process change such as a change in metal thickness or welding process, the saved data is referred to and is amended to provide a modified assembly.

According to the second aspect, the attachment data may include at least one of distance data, angle data, and connection data concerning the parts.

According to the second aspect the edit data may include at least one of connection-hole position data and connection-hole shape data concerning the parts.

According to the second aspect, the parts may include single parts and components each made of a plurality of single parts.

According to the second aspect, the assembling data may include data to assemble a component from single parts.

According to the second aspect, the method may include saving attribute data defining attributes of the parts.

According to the second aspect, the attribute data may include data defining colors of the parts.

According to a third aspect of the present invention, a method of editing an assembly with CAD includes selecting, through navigation, a first element of a first part among parts displayed on a CAD screen the parts being made of sheet metal and being assembled into the assembly, the navigation automatically selecting an element of a part under a cursor as the cursor is moved on the CAD screen, and dragging the first part including the first element with the cursor in one of horizontal and perpendicular directions relative to the first element.

The third aspect uses the nature of sheet-metal parts that they substantially have a constant thickness and moves the parts in a way appropriate for actual assembling work. The third aspect selects a first element of a first part through navigation and moves the first part relative to the first element.

According to the third aspect, the parts may include single parts and components each made of a plurality of single parts.

According to the third aspect, the first element may include one of a line or a face.

According to the third aspect, the method may include rotating the first part around the first element.

According to the third aspect, the method may include rotating the first part around a line or a normal to a face of the first part.

According to the third aspect, the method may include flipping the first part relative to the first element.

According to the third aspect, the method may include selecting, through navigation, a second element of a second part among the parts displayed on the CAD screen, and attaching the first element of the first part to the second element of the second part.

The third aspect drags the first part and attaches the first element of the first part to the second element of the second part. The third aspect visually and intuitively moves and attaches parts. The third aspect easily selects the second element through navigation. The third aspect employs dragging and dropping operations, to easily edit an assembly with CAD.

According to the third aspect, the second element may include one of a line or a face.

According to the third aspect, the first and second elements may be faces.

According to the third aspect, the method may include setting an attaching state of the first and second elements.

According to the third aspect, the operation of setting an attaching state may set at least one of the distance, angle, and connection of the first and second parts.

According to the third aspect, the operation of setting an attaching state may display a dialog window and may be carried out through the dialog window.

According to a fourth aspect of the present invention, a method of editing an assembly with CAD includes selecting a first part in which a connection hole is formed among parts that are made of sheet metal and are assembled into the assembly, selecting a first face from the first part and setting a type of the connection hole to be formed in the first face, setting a location of the connection hole on the first face, and finding a second face of a second part corresponding to the first face.

The fourth aspect automatically finds a second face corresponding to the first face, to easily form a combination of, for example, a projection such as burring and a hole in the first and second faces.

According to the fourth aspect, the operation of setting a type of the connection hole may include choosing a type of the connection hole from a group including burring and tapping.

According to the fourth aspect, the operations of setting the type and location of the connection hole may display a dialog window and may be carried out through the dialog window.

According to a fifth aspect of the present invention, a computer readable medium contains software of editing an assembly with CAD, wherein the software includes reading parts data defining parts that are made of sheet metal and are assembled into the assembly, reading attachment data defining attachment relationships among the parts, reading edit data defining edit states of the parts, reading assembling data defining an assembling sequence of the parts, and assembling the parts into the assembly according to the parts data, attachment data, edit data, and assembling data.

According to the fifth aspect, the computer readable medium may include at least one of hard disk drives, magnetic or optical disks, and magnetic tapes.

According to the fifth aspect, the attachment data may include at least one of distance data, angle data, and connection data concerning the parts.

According to the fifth aspect, the edit data may include at least one of connection-hole position data and connection-hole shape data concerning the parts.

According to the fifth aspect, the parts may include single parts and components, each component being made of a plurality of single parts.

According to the fifth aspect, the assembling data may include data to assemble a component from single parts.

According to the fifth aspect, the software may further include reading attribute data defining attributes of the parts, the attribute data parts data, attachment data, edit data, and assembling data being used to assemble the parts into the assembly.

According to the fifth aspect, the attribute data may include data defining colors of the parts.

According to a sixth aspect of the present invention, a computer readable medium contains software of editing an assembly with CAD, wherein the software includes saving parts data defining parts that are made of sheet metal and are assembled into the assembly, saving attachment data defining attachment relationships among the parts, saving edit data defining edit states of the parts, and saving assembling data defining an assembling sequence of the parts.

According to the sixth aspect, the computer readable medium may include at least one of hard disk drives, magnetic or optical disks, and magnetic tapes.

According to the sixth aspect, the attachment data may include at least one of distance data, angle data, and connection data concerning the parts.

According to the sixth aspect, the edit data may include at least one of connection-hole position data and connection-hole shape data concerning the parts.

According to the sixth aspect, the parts may include single parts and components, each component being made of a plurality of single parts.

According to the sixth aspect, the assembling data may include data to assemble a component from single parts.

According to the sixth aspect, the software may further include saving attribute data defining attributes of the parts.

According to the sixth aspect, the attribute data may include data defining colors of the parts.

According to a seventh aspect of the present invention, a computer readable medium contains software of editing an assembly with CAD, wherein the software includes selecting, through navigation, a first element of a first part among parts displayed on a CAD screen, the parts being made of sheet metal and being assembled into the assembly, the navigation automatically selecting an element of a part under a cursor as the cursor is moved on the CAD screen, and dragging the first part including the first element with the cursor in one of horizontal and perpendicular directions relative to the first element.

According to the seventh aspect, the medium may include at least one of hard disk drives, magnetic or optical disks, and magnetic tapes.

According to the seventh aspect the parts may include single parts and components, each component being made of a plurality of single parts.

According to the seventh aspect the first element may include one of a line or a face.

According to the seventh aspect, the software may include rotating the first part around the first element.

According to the seventh aspect, the software may include rotating the first part around a line or a normal to a face of the first part.

According to the seventh aspect, the software may include flipping the first part relative to the first element.

According to the seventh aspect, the software may further include selecting, through navigation, a second element of a second part among the parts displayed on the CAD screen, and attaching the first element of the first part to the second element of the second part.

According to the seventh aspect, the second element may include one of a line or a face.

According to the seventh aspect, the first and second elements may be faces, respectively.

According to the seventh aspect, the software may further include setting an attaching state of the first and second elements.

According to the seventh aspect, the operation of setting an attaching state may set at least one of the distance, angle, and connection of the first and second parts.

According to the seventh aspect, the operation of setting an attaching state may display a dialog window and is carried out through the dialog window.

According to an eighth aspect of the present invention, a computer readable medium contains software of editing an assembly with CAD, wherein the software includes selecting a first part in which a connection hole is formed among parts that are made of sheet metal and are assembled into the assembly, selecting a first face from the first part and setting a type of the connection hole to be formed in the first face, setting a location of the connection hole on the first face, and finding a second face of a second part corresponding to the first face.

According to the eighth aspect, the medium may include at least one of hard disk drives, magnetic or optical disks, and magnetic tapes.

According to the eighth aspect, the operation of setting a type of the connection hole may include choosing a type of the connection hole from a group including burring and tapping.

According to the eighth aspect, the operations of setting the type and location of the connection hole may display a dialog window and may be carried out through the dialog window.

BRIEF DESCRIPTION OF THE DRAWINGS

FIG. 9 shows a window displaying a rotation dialog window;

FIGS. 11A to 11D show windows explaining rotation operations carried out around a normal.

FIGS. 22A to 22D explain a center button and a reference button in the assembly dialog window;

FIGS. 23A to 23D explain a flip button in the assembly dialog window;

FIGS. 24A to 24D explain in/out buttons to set a connection state between two parts;

FIG. 35 shows a window displaying the connecting locations of the sixth and seventh parts.

DETAILED DESCRIPTION OF EMBODIMENTS

Various embodiments of the present invention will be described with reference to the accompanying drawings.

Figure 1:
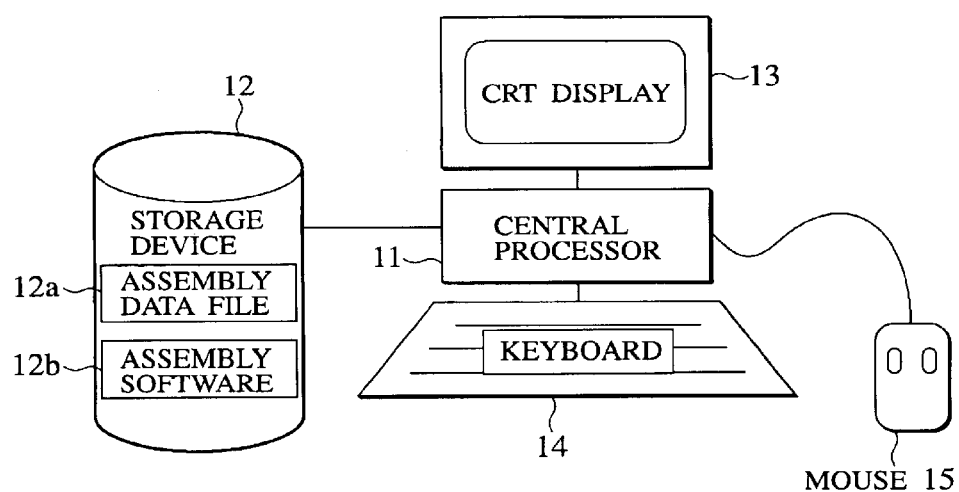
FIG. 1 roughly shows a CAD system according to an embodiment of the present invention.

FIG. 1 roughly shows a CAD system for achieving an assembly editing method according to an embodiment of the present invention.

The CAD system has a central processor 11 to centrally process data, a storage device 12 to store data to be processed by the central processor 11, a CRT display 13 to display character data, image data, and the like supplied from the central processor 11, a keyboard 14 to enter character data, and a mouse 15 to enter positional data.

The central processor 11 has a CPU, ROM, RAM, and the like to centrally process data in the CAD system. Assembly editing operations explained below are carried out according to programs executed by the central processor 11.

The storage device 12 is, for example, a hard disk drive to store a large amount of data including an assembly data file 12a and assembly software 12b.

The assembly data file 12a contains object data concerning an assembly. The structure of the object data will be explained later. The storage device 12 may store a plurality of assembly data files concerning a plurality of assemblies to edit. The assembly software 12b is read and executed by the central processor 11, to achieve the assembly editing method according to the present invention.

The CRT display 13 employs a bit-map method to display character data and image data supplied from the central processor 11. The display 13 displays, for example, an assembly made of sheet-metal parts, as well as graphical user interfaces (GUIs) to edit the assembly.

The keyboard 14 has a plurality of keys to enter character data, control commands, and coordinate values related to an assembly displayed on the display 13.

The mouse 15 is slid on, for example, a desk to enter positional data. Buttons on the mouse 15 are pressed to enter data. The mouse 15 is used to move a cursor on the display 13 and select GUI buttons on the display 13.

The CAD system having the central processor 11, storage device 12, display 13 keyboard 14, and mouse 15 may be realized by, for example, a personal computer.

The structure of assembly data in the assembly data file 12a will be explained.

According to the embodiment, assembly data consists of object models. A data structure or an object is prepared for each assembly, each part, or each operation such as an attaching operation and an assembling operation.

In the following explanation, an assembly consists of parts, and the parts are classified into single parts and components, each component being made of a plurality of single parts. In other words, an assembly consists of components, and each component consists of single parts. The single parts are simply referred to as parts.

In the following explanation, elements within brackets "[ ]" are optional. The assembly data is structured as follows:
(assembly
[(name)]
[(component), . . . , (component)]
[(attachment), . . . , (attachment)]
[(edit), . . . , (edit)]
[(assembling), . . . , (assembling)]
[(color), . . . , (color)])

The assembly data includes component data specifying components that form the assembly, attachment data specifying the attaching states of the components, edit data specifying the editing states of the components, assembling data specifying the assembling of parts into the components, and color data specifying colors of the components.

The attachment data, edit data, assembling data, and color data are prepared for each component. The name, component data, edit data, assembling data, and color data are optional. Namely, they may be omitted.

The designing of an assembly frequently involves a design or process change such as a change in metal thickness or welding process. According to the embodiment, the assembly data includes not only the component data but also the attachment data, edit data, assembling data, and color data, and therefore, it is easy to amend and reconfigure the assembly.

In the following explanation, braces "{ }" define elements among which one must be selected. The component data is structured as follows:
(component
[(name)]
{(component reference), (part reference)}
[(reference plane)]
[(flat transformation)]
[(3-D transformation)])

The component data includes the name of the component, data specifying a reference file of the component or a part data specifying a reference plane used to prepare drawings, data to prepare flat drawings, and data to prepare 3-D drawings. The name, component reference data part reference data, reference plane data, flat transformation data, and 3-D transformation data are optional.

The attachment data is used to attach components to one another and form an assembly and is structured as follows:
(attachment
(type{face-face, face-line, line-line, center-center})
(attachment parameter {face-face, face-line, line-line, center-center}))

The attachment data includes data specifying an attachment type and data specifying attachment parameters corresponding to the attachment type. According to the embodiment, there are four attachment types, i.e., face-face, face-line, line-line, and center-center.

The attachment parameter data for face-face, face-line, and center-center will be explained.

The face-face attachment parameter data is structured as follows:
(face-face attachment parameter
(face 1)
(face 2)
(face 1 is top {true, false})
(face 2 is top {true, false})
(distance))

The face-face attachment parameter data includes data specifying reference faces 1 and 2 to be attached to each other, data specifying whether or not the faces 1 and 2 are on top, and data specifying the distance between the faces 1 and 2.

The face-line attachment parameter data is structured as follows:
(face-line attachment parameter
(face)
(line)
(face is top {true, false})
(line is top {true, false})
(distance)
(angle)
(face is movable {true, false}))

The face-line attachment parameter data includes data specifying a reference face and a reference lien to be attached to each other, data specifying whether or not the face and line are on top, data specifying the distance and angle between the face and the line, and data specifying whether or not the face is movable.

The center-center attachment parameter data is structured as follows:

(center-center attachment parameter
(face 1)
(face 2)
(face 1 is top {true, false})
(face 2 is top {true, false})
(distance))

The center-center attachment parameter data includes data specifying reference faces 1 and 2 to be attached, data specifying whether or not the faces 1 and 2 are on top, and data specifying the distance between the centers of the faces 1 and 2.

The assembling data is used to assemble a component from parts and is structured as follows:

(assembling
[(name)]
(element)
(distance)
(part), [(part)], . . . , [(part)])

The assembling data includes data specifying the name of the assembling, data specifying a reference element and distance and data on parts. A component includes at least one part, and therefore, at least a piece of data related to the part is needed to assemble the component.

The color data specifies the color of a component and is structured as follows:

(color
(component color)
[(part color)]
[(flange color)]
[bend line color)])

The color data includes data specifying the color of the components data specifying the color of parts of the component, data specifying the color of a flange, and data specifying the color of a bend line. Among these data pieces, the colors of flange and bend line are optional. The colors of flange and bend line are each specified with R, G, and B elements.

Figure 2:
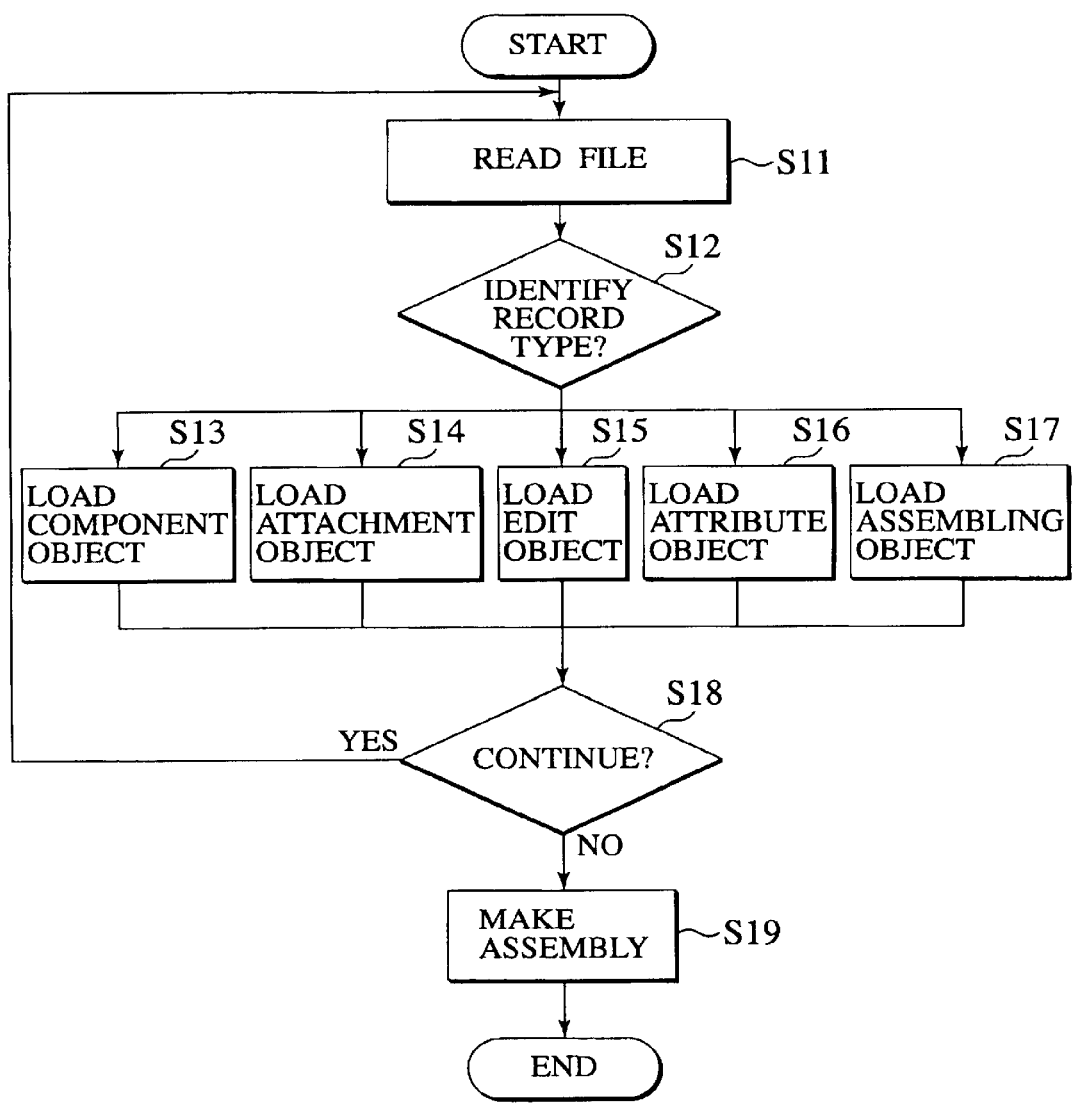
FIG. 2 is a flowchart showing a sequence of reading assembly data.

FIG. 2 is a flowchart showing a sequence of reading assembly data according to an embodiment of the present invention.

This sequence is achieved by the CAD system of FIG. 1 in which the central processor 11 reads the assembly data file 12a from the storage device 12.

As explained above, the assembly data covers not only components that constitute an assembly but also attachment data specifying the attaching states of the components, edit data specifying the editing states of the components, assembling data specifying the assembling of parts into the components, and attribute data specifying, for example, the colors of the components. The assembly data read sequence is achieved according to the assembly software 12b read from the storage device 12.

The sequence is started in response to a read command. For example, the user enters the read command in a command line, or manipulates the mouse 15 to press a read command button in the GUI on the display 13.

In step S11, the central processor 11 reads the assembly data file 12a from the storage device 12.

In step S12, the central processor 11 identifies a record type in the read file and branches accordingly. If the record type is "component," step S13 is carried out. If the record type is "attachment," step S14 is carried out. If the record type is "edit," step S15 is carried out. If the record type "assembling," step S16 is carried out. If the record type is "attribute," step S17 is carried out.

The central processor 11 loads component data in step S13, attachment data in step S14, edit data in step S15, attribute data in step S16, and assembling data in step S17.

In step S18, the central processor 11 checks to see if the read operation of the assembly data file 12a must be continued. If NO in step S18, step S19 is carried out, and if YES, step S11 is again carried out to further read the file 12a.

In step S19, the central processor 11 assembles an assembly. Namely, the central processor 11 assembles the components loaded in step S13 according to the attachment data loaded in step S14, the edit data loaded in step S15, the attribute data loaded in step S16, and the assembling data loaded in step S17.

In this way, the embodiment employs the attachment data, edit data, attribute data, and assembling data to construct an assembly, so that any process or design change can easily be reflected to modify the assembly.

Figure 3:
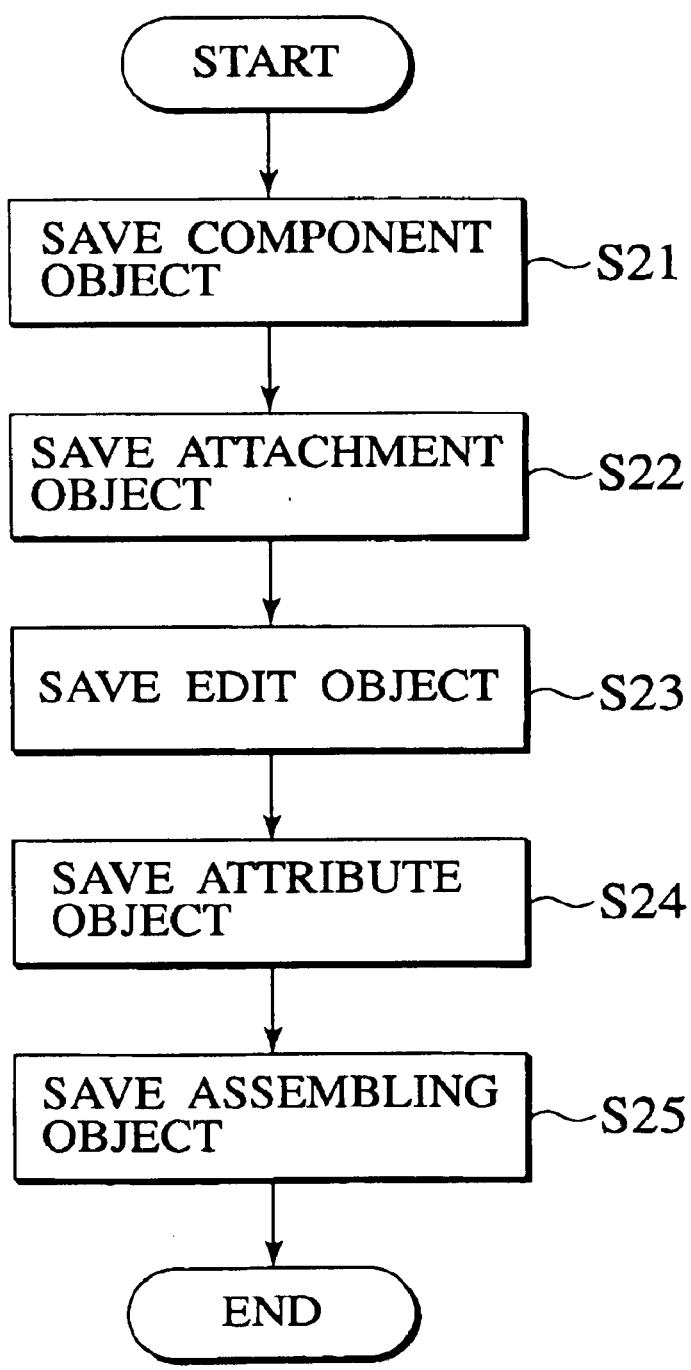
FIG. 3 is a flowchart showing a sequence of saving assembly data.

FIG. 3 is a flowchart showing a sequence of saving assembly data according to an embodiment of the present invention.

The sequence is achieved by the CAD system of FIG. 1 in which the central processor 11 saves the assembly data file 12a in the storage device 12.

As explained above, the assembly data covers not only data concerning components that constitute an assembly but also attachment data specifying the attaching states of the components, edit data specifying the editing states of the components, attribute data specifying, for example, the colors of the components, and assembling data specifying the assembling of parts into the components. The save sequence of FIG. 3 saves the assembly data into the storage device 12 according to the assembly software 12b read from the storage device 12.

The save sequence is started in response to a save command. For example, the user enters the save command in a command line, or manipulates the mouse 15 to press a save command button in the GUI on the display 13.

In step S21, the central processor 11 saves component data in the assembly data file 12a in the storage device 12.

In step S22, the central processor 11 saves attachment data in the assembly data file 12a in the storage device 12.

In step S23, the central processor 11 saves edit data in the assembly data file 12a in the storage device 12.

In step S24, the central processor 11 saves attribute data concerning, for example, colors in the assembly data file 12a in the storage device 12.

In step S25, the central processor 11 saves assembling data in the assembly data file 12a in the storage device 12.

As a result, the assembly data file 12a in the storage device 12 contains not only data on components that constitute an assembly but also attachment data, edit data, attribute data, and assembling data related to the components. According to the saved data, any process or design change can easily be reflected on the assembly.

Figure 4:
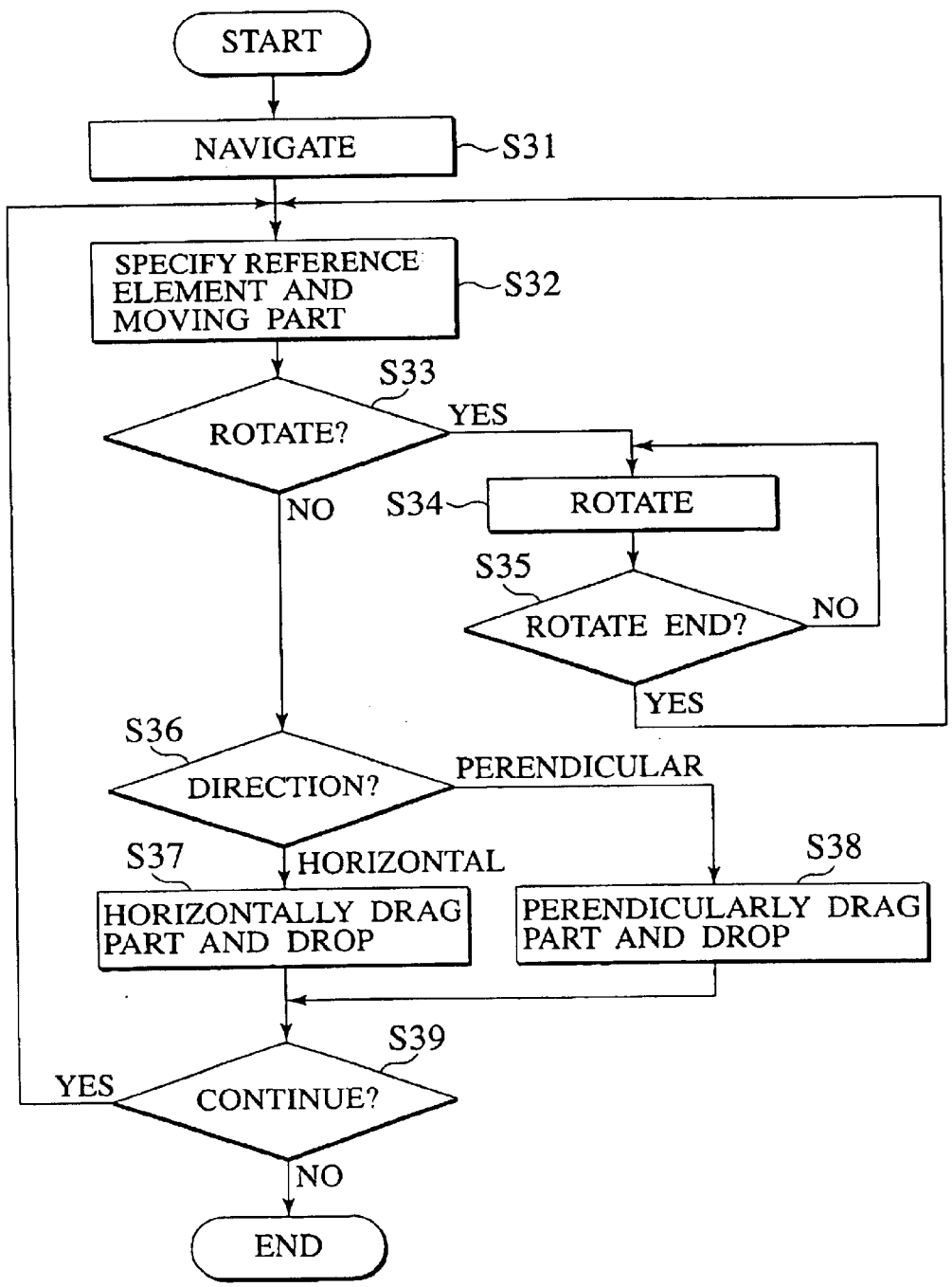
FIG. 4 is a flowchart showing a sequence of moving a part according to an embodiment of the present invention.

FIG. 4 is a flowchart showing a sequence of moving a part according to an embodiment of the present invention. The sequence is carried out according to the assembly software 12b read from the storage device 12.

The sequence is carried out for parts displayed on the display 13. Each of the parts consists of elements. The sequence includes selecting a first element of a first part among the displayed parts through navigation that automatically selects an element of a part under a cursor as the cursor is moved on the display 13, and dragging the first part including the first element with the cursor in one of horizontal and perpendicular directions relative to the first element.

This sequence uses the nature of sheet-metal parts that they substantially have a constant thickness and moves parts in a way appropriate for actual assembling work. The sequence selects a first element of a first part through navigation and moves the first part relative to the first element.

The sequence is started by selecting a horizontal or perpendicular move command. For example, the user enters the command in a command line, or manipulates the mouse 15 to press a horizontal/perpendicular move command button in the GUI on the display 13.

In step S31 of FIG. 4, navigation is carried out.

Figure 5:
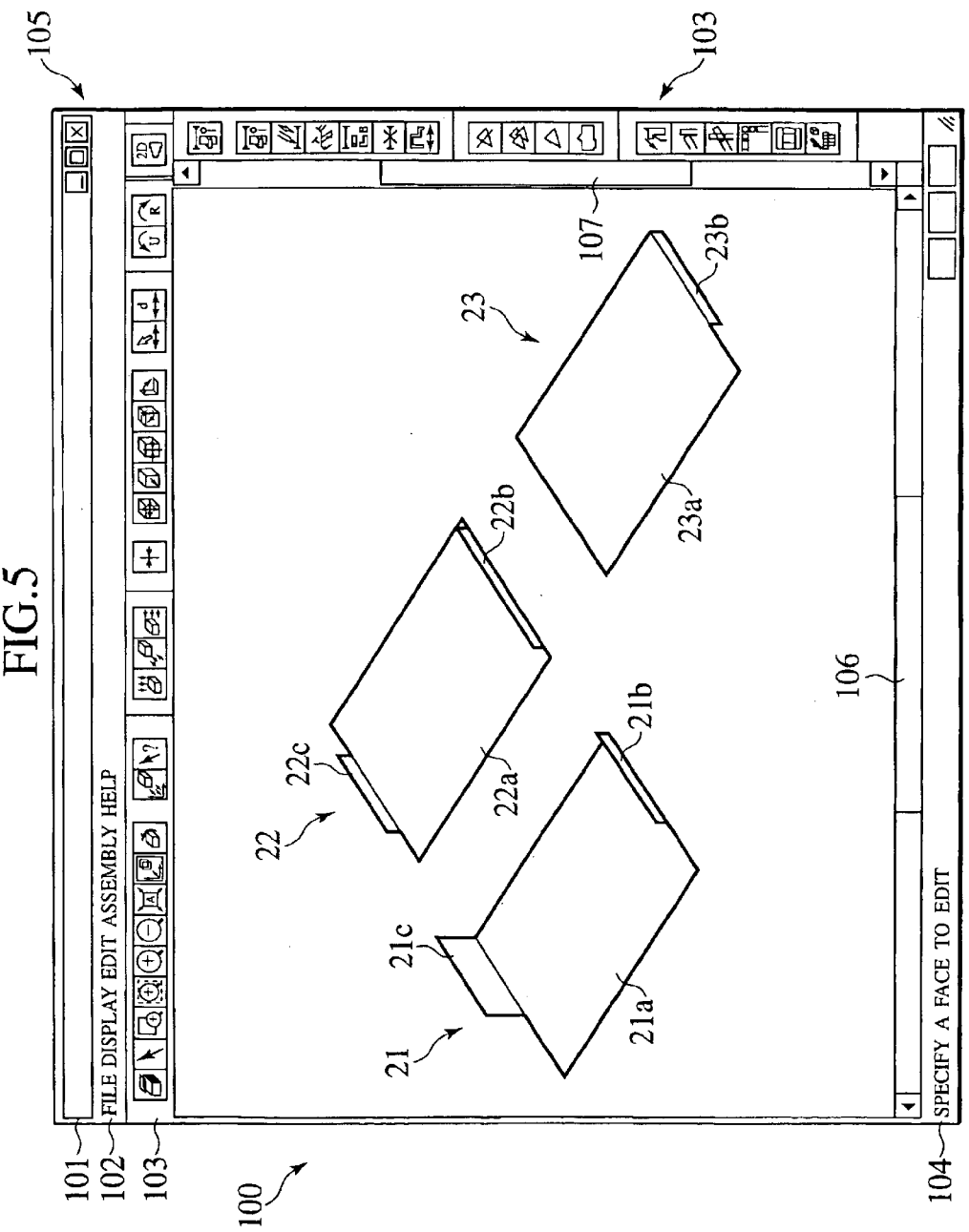
FIG. 5 shows a window displaying first to third parts to edit.

FIG. 5 shows a window 100 displaying parts to edit. The window 100 is a rectangular area partly or wholly occupying the screen of the display 13.

The window 100 includes a title bar 101 displaying a title of the window 100, a command bar 102 to enter a command such as a file manipulating command, a tool bar 103 having various edit buttons and a status bar 104 to display a message.

The window 100 also includes an operation button section 105 including a minimizing button, a maximizing button, and a close button, a horizontal scroll bar 106, and a vertical scroll bar 107.

The window 100 of FIG. 5 is displaying perspective views of first to third parts 21 to 23 each made of sheet metal and having a flat rectangular shape. The first to third parts 21 to 23 have principal faces in the same plane and are parallel to one another with opposing sides running in parallel with each other in the same plane.

The first part 21 has a rectangular principal face 21a, a rectangular first flange 21b vertically formed at an end of the principal face 21a, and a rectangular second flange 21c vertically formed at the other end of the principal face 21a in parallel with the first flange 21b.

The second part 22 has a rectangular principal face 22a, a rectangular first flange 22b vertically formed at an end of the principal face 22a, and a rectangular second flange 22c vertically formed at the other end of the principal face 22a in parallel with the first flange 22b.

The third part 23 has a rectangular principal face 23a and a first flange 23b vertically formed at an end of the principal face 23a.

The status bar 104 displays a message "Specify a face to edit" to prompt the user to select a part through navigation.

Figure 6:
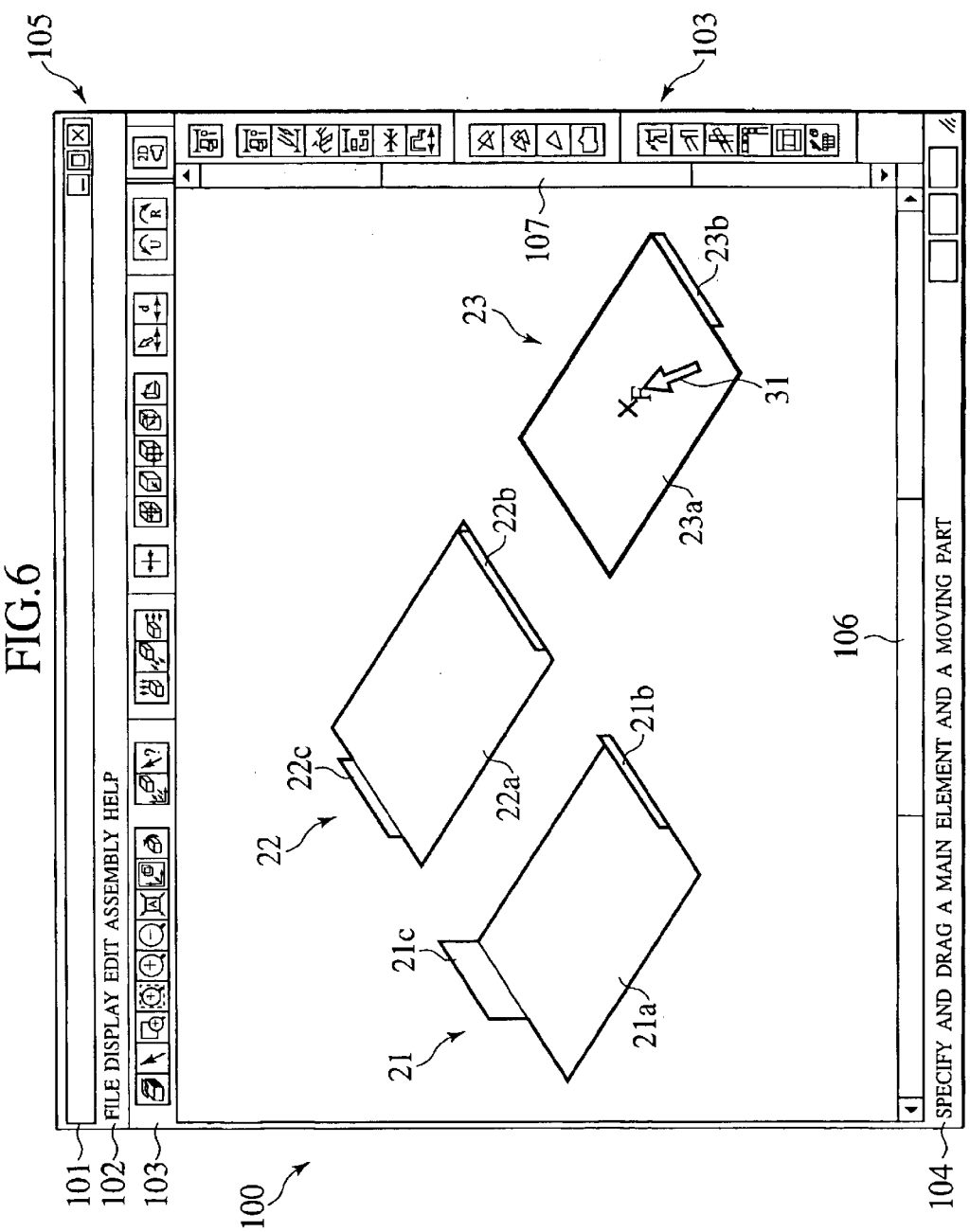
FIG. 6 shows a window displaying navigation.

FIG. 6 shows the window 100 in which navigation is being carried out.

The navigation is an operation to specify an element such as a line or a face on a part. Table 1 shows elements and movements according to this embodiment.

TABLE 1

| Element | Parallel move | Perpendicular move |
|---------|---------------|--------------------|
| Face | Move parallel to face (two degrees of freedom) | Move perpendicular to face (one degree of freedom) |
| Line | Move parallel to line (one degree of freedom) | Move perpendicular to line and parallel to face whose edge is the line (one degree of freedom) |
| Center | Move parallel to plane containing arc (two degrees of freedom) | Move perpendicular to plane containing arc (one degree of freedom) |
| Bend line | Move parallel to bend line (one degree of freedom) | No move |
| Endpoint | No move | No move |

When a cursor 31 is moved in the window 100, an element under the cursor 31 is automatically selected. This automatic selection in response to the movement of the cursor 31 is called "navigation." The cursor 31 in the window 100 moves in response to the movement of the mouse 15 manipulated by the user.

In FIG. 6, the cursor 31 is on the principal face 23a of the third part 23, and therefore, the principal face 23a under the cursor 31 is selected. Four side lines of the selected principal face 23a are highlighted, and a cross mark "x" is highlighted at the center of the principal face 23a. At the same time, a character "F" is displayed adjacent to the cross mark, to indicate that the cross mark represents the principal face 23a.

The status bar 104 displays a message "Specify and drag a main element and a moving part" to prompt the user to specify an element and a moving part and drag the moving part.

In step S32, the user selects a moving part and a reference element relative to which the moving part is moved.

The user clicks the mouse 15, i.e., presses a proper button of the mouse 15 on an element selected by navigation, to specify the element as a reference element and the part that contains the element as a moving part.

Figure 7:
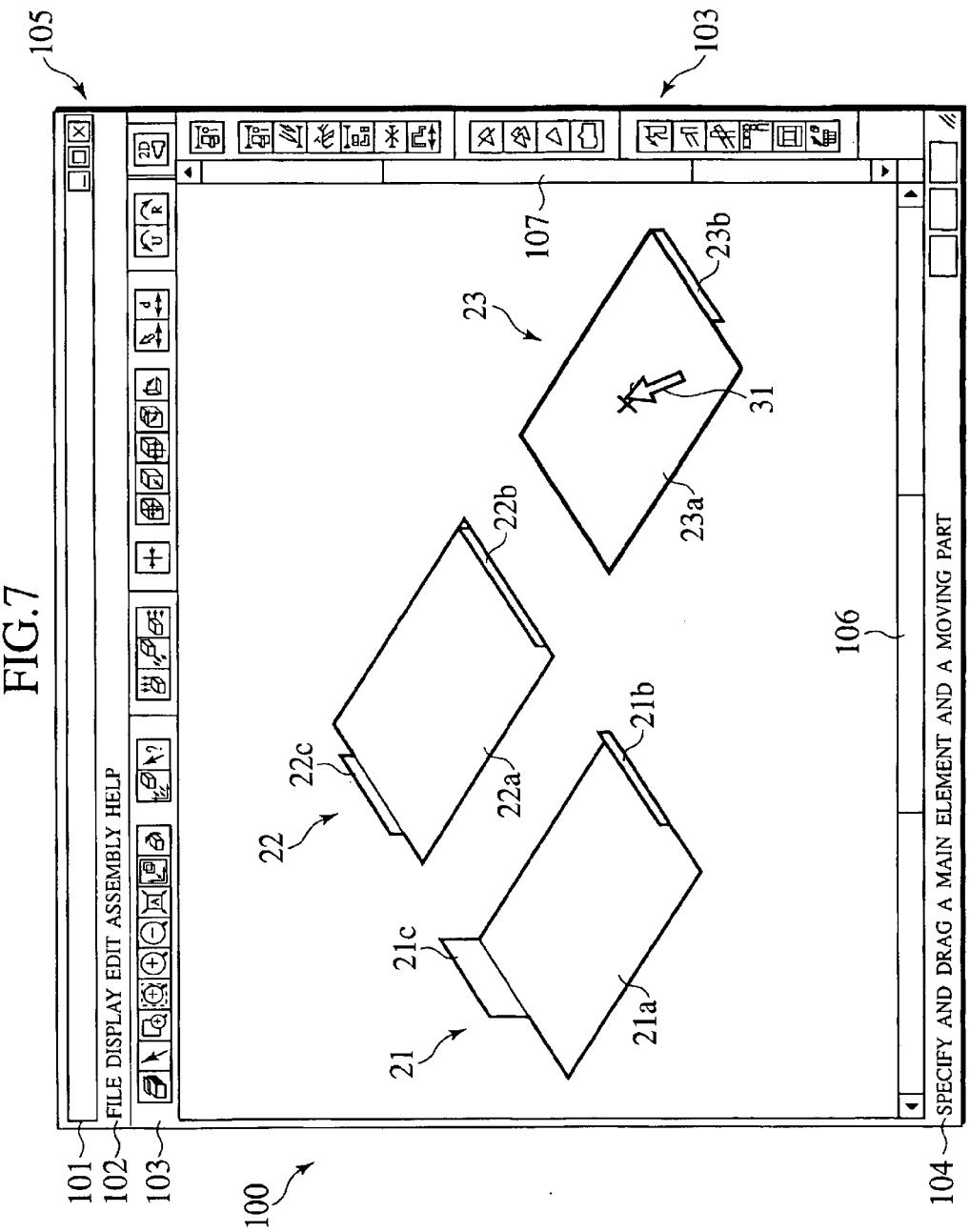
FIG. 7 shows a window displaying the third part specified as a moving part and a principal face of the third part specified as a reference element.

FIG. 7 shows the window 100 displaying the principal face 23a of the third part 23 specified as a reference element and the third part 23 specified as a moving part.

When the user positions the cursor 31 on the principal face 23a of the third part 23, the principal face 23a is automatically selected by navigation. The user may click the mouse 15 to specify the principal face 23a as a reference element. The principal face 23a is highlighted. At this time, the third part 23 that contains the principal face 23a is specified as a moving part and becomes translucent so that parts under the moving part may be visible.

Figure 8:
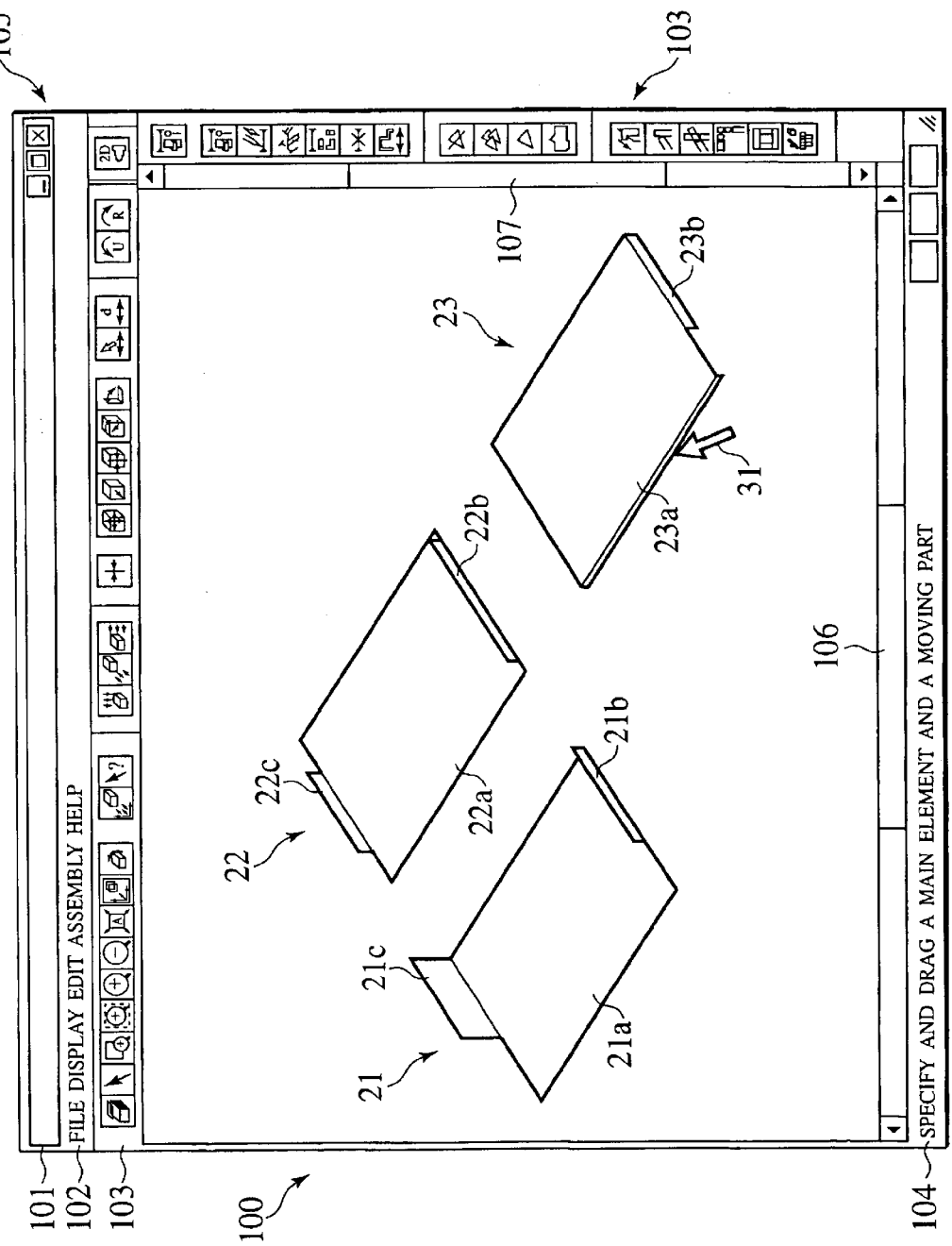
FIG. 8 shows a window displaying a side line of the third part specified as a reference element.

FIG. 8 shows the window 100 displaying a side line of the third part 23 specified as a reference element.

When the user positions the cursor 31 on a side line 23d of the principal face 23a of the third part 23, the line 23d is selected by navigation. If the user clicks the mouse 15, the line 23d is selected as a reference element and is highlighted. At the same time, the third part 23 that contains the selected line 23d is specified as a moving part and becomes translucent.

In step S33, it is determined whether or not the moving part must be rotated. Although the sequence of FIG. 4 mainly relates to a horizontal or perpendicular movement of a part, it may rotate the part if required.

If the user wants to rotate the specified moving part, the user enters a rotation command in a command line, or manipulates the mouse 15 to press a rotation command button in the GUI on the display 13.

If the moving part must be rotated, step S34 is carried out, and if not, step S36 is carried out.

In step S34, a rotation dialog window 41 is displayed to carry out a rotation operation.

FIG. 9 shows the window 100 displaying the rotation dialog window 41.

The rotation dialog window 41 includes a title bar 41a with a title "Part rotation," an angle setting area 41b to set a rotation angle, a reverse button 41c, a left button 41d with a left arrow, a right button 41e with a right arrow, an OK button 41f a cancel button 41g, and a close button 41h.

The angle setting area 41b is used to set a rotation angle for each rotation operation. The reverse button 41c is used to reverse the specified face of the moving part. The left button 41d is used to rotate the face of the moving part in the counterclockwise direction. The right button 41e is used to rotate the face of the moving part in the clockwise direction.

The OK button 41f saves the rotation angle set in the angle setting area 41b and closes the dialog window 41. The cancel button 41g does not save the rotation angle and closes the dialog window 41. The close button 41h is the same as the cancel button 41g.

FIGS. 10A to 10D explain the reversing of a face of a moving part.

Figure 10A:
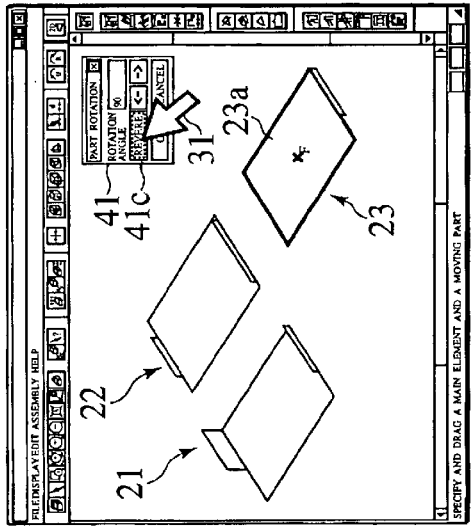
FIGS. 10A to 10D show windows explaining flipping operations.

In FIG. 10A, the window 100 displays the principal face 23a of the third part 23 specified as a reference element. Based on the principal face 23a, the third part 23 is reversed.

The user positions the cursor 31 on the reverse button 41c in the rotation dialog window 41 and clicks the mouse 15 to select the reverse button 41c.

In the following explanation, the selecting of a GUI button is carried out by positioning the cursor 31 on the button and by clicking the mouse 15.

Figure 10B:
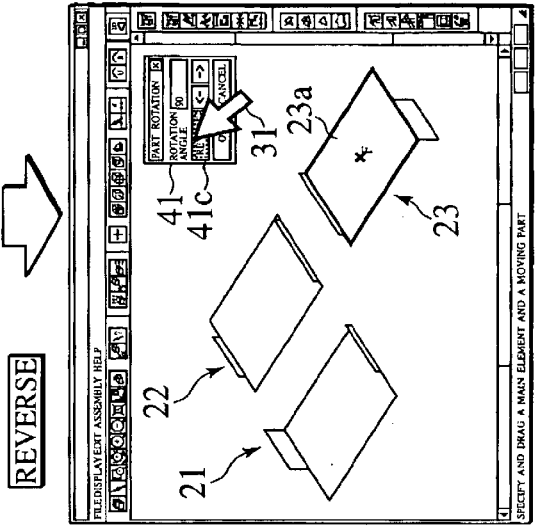

FIG. 10B shows a result of pressing the reverse button 41c in FIG. 10A. In FIG. 10B, the third part 23 is in a first reversed state with the principal face 23a being common to the states of FIGS. 10A and 10B.

Figure 10C:
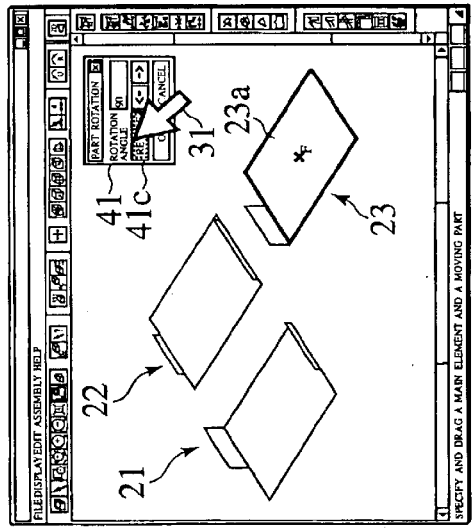

FIG. 10C shows a result of pressing the reverse button 41c in FIG. 10B. In FIG. 10C, the third part 23 is in a second reversed state that is different from the first reversed state. The principal face 23a is common to the states of FIGS. 10B and 10C.

Figure 10D:
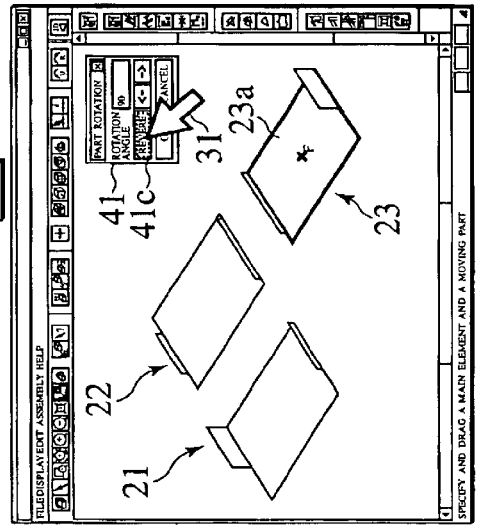

FIG. 10D shows a result of pressing the reverse button 41c in FIG. 10C. In FIG. 10D, the third part 23 is in a third reversed state that is different from the first and second reversed states. The principal face 23a is common to the states of FIGS. 10A and 10D.

If the reverse button 41c is pressed in FIG. 10D, the state of FIG. 10A is restored. In this way, a rectangular reference element may be reversed into four states with the rectangular reference element being common to the four states.

FIGS. 11A to 11D explain the rotation of a moving part around a normal of a reference face.

In FIG. 11A, the window 100 displays the principal face 23a of the third part 23 specified as a reference element. Around a normal of the principal face 23a, the third part 23 is rotated. The normal serving as a rotation axis is, for example, at the center of the principal face 23a.

In the rotation dialog window 41, a rotation angle of 90° is set in the angle setting area 41b. The user may press the left button 41d or the right button 41e, to rotate the third part 23 around the normal in the counterclockwise or clockwise direction by the rotation angle.

FIG. 11B shows a result of pressing the right button 41e in FIG. 11A. The third part 23 is rotated from the state of FIG. 11A around the normal by 90° in the clockwise direction.

FIG. 11C shows a result of pressing the right button 41e in FIG. 11B. The third part 23 is rotated from the state of FIG. 11B around the normal by 90° in the clockwise direction.

FIG. 11D shows a result of pressing the right button 41e in FIG. 11C. The third part 23 is rotated from the state of 11C around the normal by 90° in the clockwise direction.

FIGS. 12A to 12D explain the rotation of a moving part around a normal of a reference line.

Figure 12A:
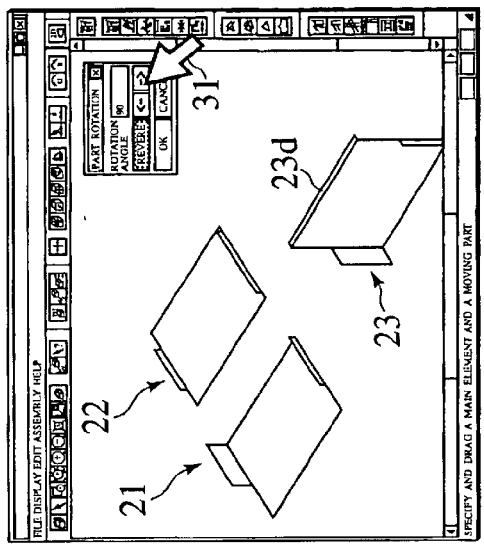
FIGS. 12A to 12D show windows explaining rotation operations carried out around a side line.

FIG. 12A shows the window 100 displaying the side line 23d of the principal face 23a of the third part 23 specified as a reference element. Around the line 23d, the third part 23 is rotated.

In the rotation dialog window 41, a rotation angle of 90° is set in the angle setting area 41b. The user may press the left button 41d or the right button 41e to rotate the third part 23 around the line 23d in the counterclockwise or clockwise direction by the rotation angle.

Figure 12B:
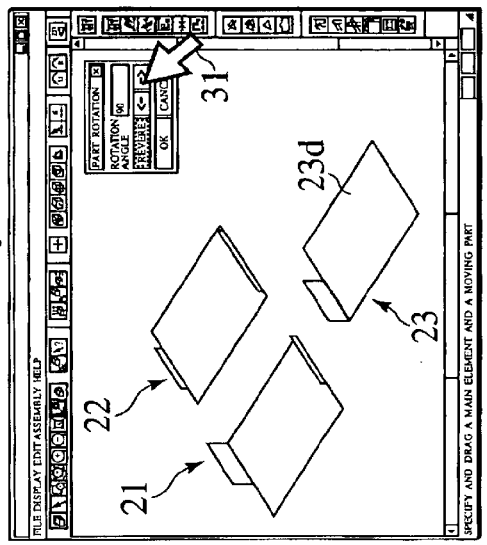

FIG. 12B shows a result of pressing the right button 41e in FIG. 12A. The third part 23 is rotated from the state of FIG. 12A around the line 23d by 90° in the clockwise direction.

Figure 12C:
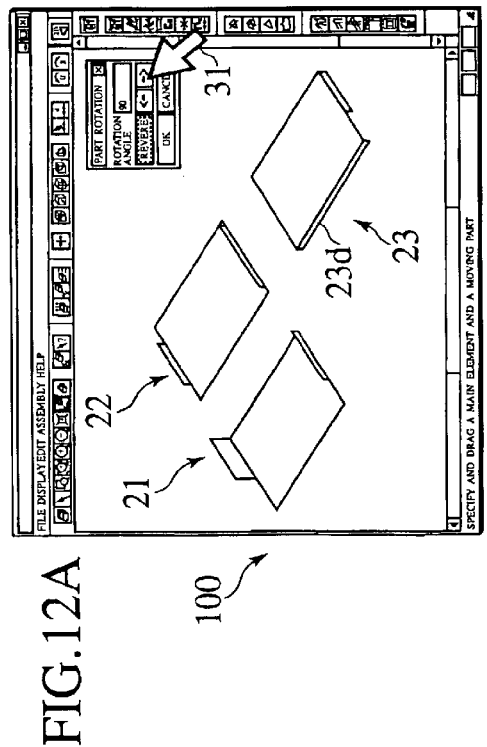

FIG. 12C shows a result of pressing the right button 41e in FIG. 12B. The third part 23 is rotated from the state of FIG. 12B around the line 23d by 90° in the clockwise direction.

Figure 12D:
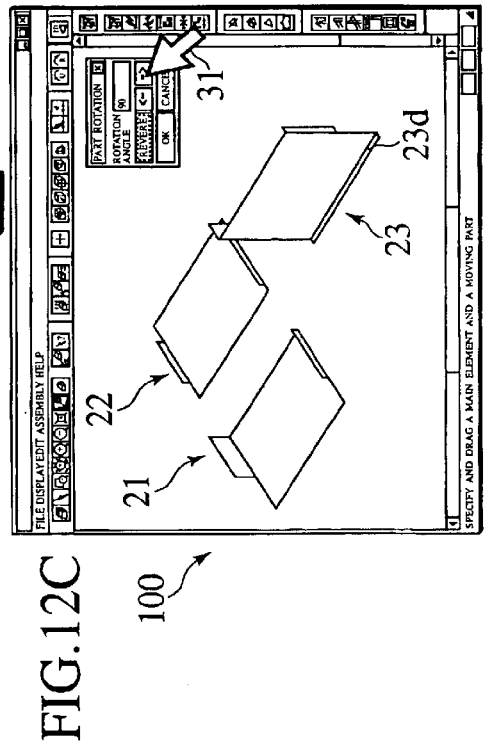

FIG. 12D shows a result of pressing the right button 41e in FIG. 12C. The third part 23 is rotated from the state of FIG. 12C around the line 23d by 90° in the clockwise direction.

In step S35 of FIG. 4, it is checked to see if the rotation operation must be terminated.

If it must be terminated, the user presses the OK button 41f, cancel button 41g, or close button 41h in the rotation dialog window 41, to close the dialog window 41.

If the dialog window 41 is closed, the central processor 11 terminates the rotation operation and returns to step S32. If the dialog window 41 is open, the central processor 11 returns to step S34 to continue the rotation operation.

In step S36, a moving direction of the moving part specified in step S32 is determined. According to the embodiment, the moving part is moved in a horizontal or perpendicular direction relative to the reference element specified in step S32. As shown in Table 1, the moving directions of a moving part are limited by the type of a reference element specified in the moving part.

A moving direction of a reference element is determined by dragging the moving part. In the window 100, the third part 23 serving as a moving part is dragged with the cursor 31 in a horizontal or perpendicular direction. If step S36 determines that the moving part must horizontally be moved, step S37 is carried out. If step S36 determines that the moving part must perpendicularly be moved, step S38 is carried out.

In step S37, the moving part is horizontally dragged and dropped In step S38, the moving part is perpendicularly dragged and dropped.

FIGS. 13A to 13D explain operations of dragging a moving part in a horizontal or perpendicular direction and dropping it.

Figure 13A:
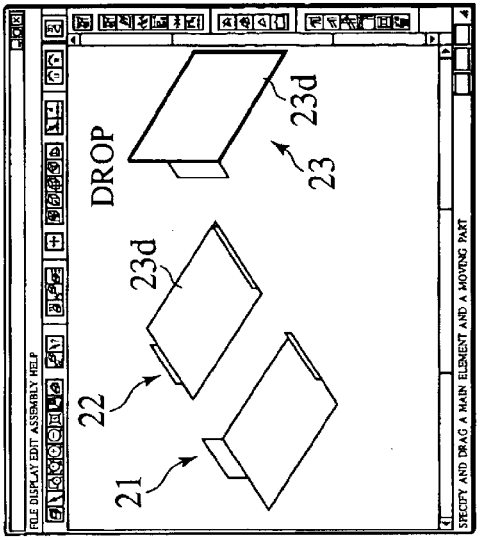
FIGS. 13A to 13D show windows explaining horizontal and perpendicular dragging and dropping operations.

In FIG. 13A, the third part 23 serving as a moving part is perpendicularly moved.

The user positions the cursor 31 on the cross mark at the center of the principal face 23a serving as a reference element in the third part 23. While pressing the button of the mouse 15, the user perpendicularly moves the cursor 31 relative to the principal face 23a. As a result, the third part 23 is dragged with the cursor 31 perpendicularly to the principal face 23a. The dragged third part 23 is highlighted and becomes translucent.

Figure 13B:
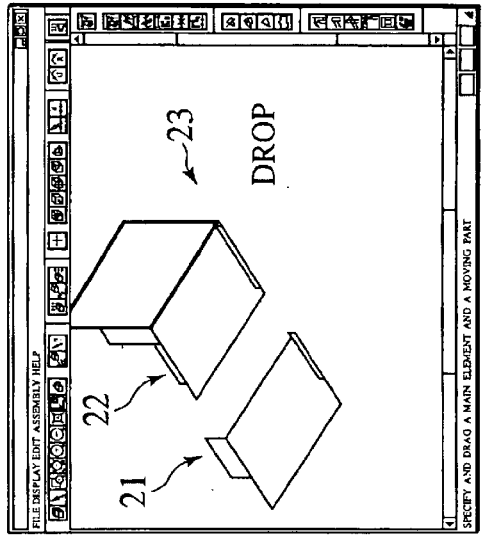

FIG. 13B shows results of perpendicularly dragging the third part 23 relative to the reference element 23a from the state of FIG. 13A and dropping the same.

The user drags the third part 23 to a required position and releases the pressed button of the mouse 15, to drop the third part 23 at the position.

Figure 13C:
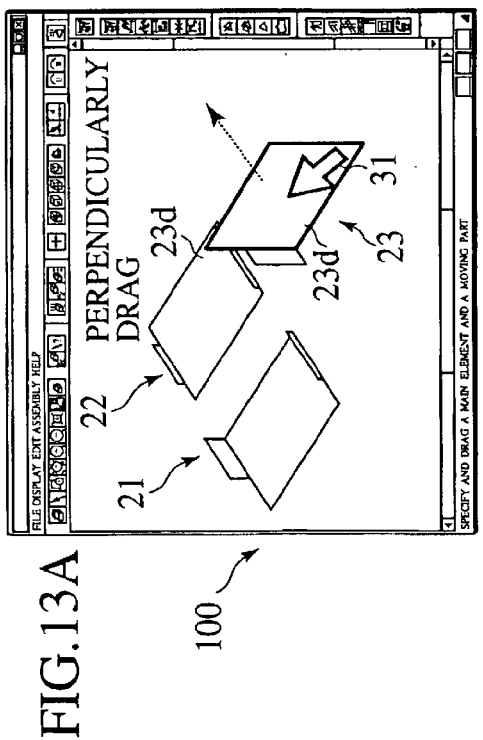

FIG. 13C shows a result of horizontally moving the third part 23 from the state of FIG. 13B.

The user positions the cursor 31 to the cross mark at the center of the principal face 23a of the third part 23. While pressing the button of the mouse 15, the user horizontally moves the cursor 31 relative to the principal face 23a. As a results the third part 23 is horizontally moved with the cursor 31 relative to the principal face 23a.

Figure 13D:
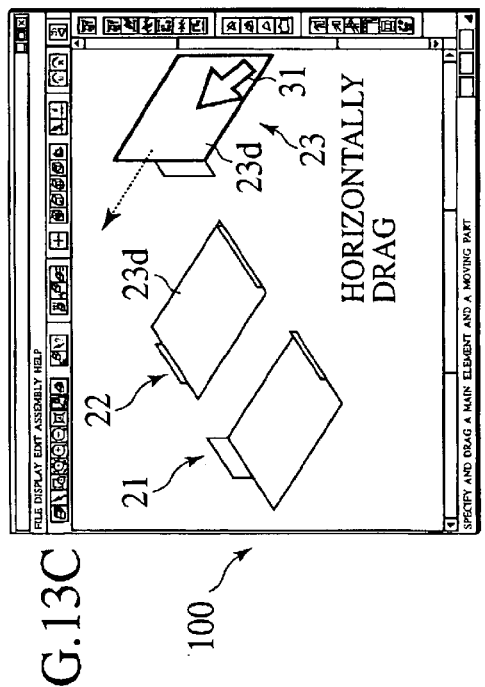

FIG. 13D shows results of horizontally dragging the third part 23 relative to the principal face 23a from the state of FIG. 13C and dropping the same. The user drags the third part 23 to a required position and releases the pressed button of the mouse 15 to drop the third part at the position.

In this embodiment, the user drops the third part 23 so that the line 23d of the principal face 23a is in contact with a side line 22d of the principal face 22a of the second part 22.

In step S39 of FIG. 4, the central processor 11 determines whether or not the part moving operation must be continued. If it must be continued, the flow returns to step S32, and if not, it is terminated.

If the user wants to terminate the part moving operation, the user presses a predetermined key. Then, the central processor 11 terminates the operation. If the user wants to continue the operation, the central processor 11 continues it.

The part moving operation has been explained in connection with moving a single part for the sake of simplicity of explanation. The part moving operation explained above is applicable to move a group of parts, or a component consisting of one or a plurality of parts.

To move a group of parts, an element of a part contained in the group is selected through navigation, and the selected element is specified as a reference element by clicking the mouse 15. At this time, the group as a whole is selected as a moving part.

Figure 14:
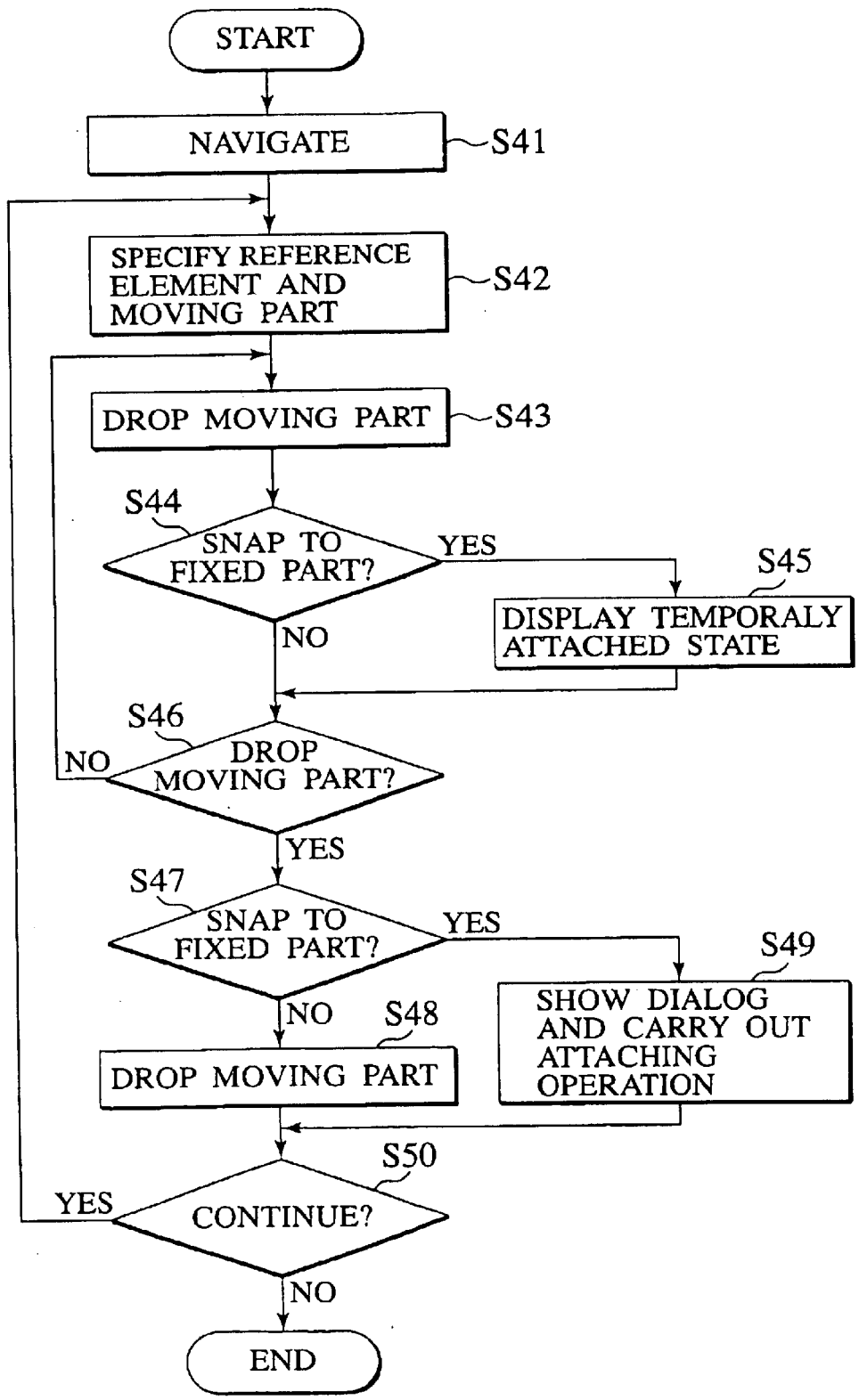
FIG. 14 is a flowchart showing a sequence of attaching (snapping) a moving part to a fixed part.

FIG. 14 is a flowchart showing a sequence of attaching (snapping) a moving part to a fixed part.

This sequence includes selecting a first element of a first part among parts displayed on the display 13 through navigation that automatically selects an element of a part under a cursor as the cursor is moved on the display 13, selecting a second element of a second part among the parts displayed on the display 13 except the first part through navigation, and attaching the first element of the first part to the second element of the second part.

This sequence drags the first part and attaches the first element of the first part to the second element of the second part. This sequence visually and intuitively moves the first part and attaches it to the second part. The second element of the second part is easily selected through navigation. The sequence uses dragging and dropping operations to easily edit an assembly with CAD.

The sequence of FIG. 14 is realized by the assembly software 12b stored in the storage device 12 and executed by the central processor 11. In the following explanation, "fixed part" is any part except a part specified as "moving part."

The sequence of FIG. 14 is started when the user enters a move-and-attach command in a command line, or when the user selects a move-and-attach command button in the GUI on the display 13.

Figure 15:
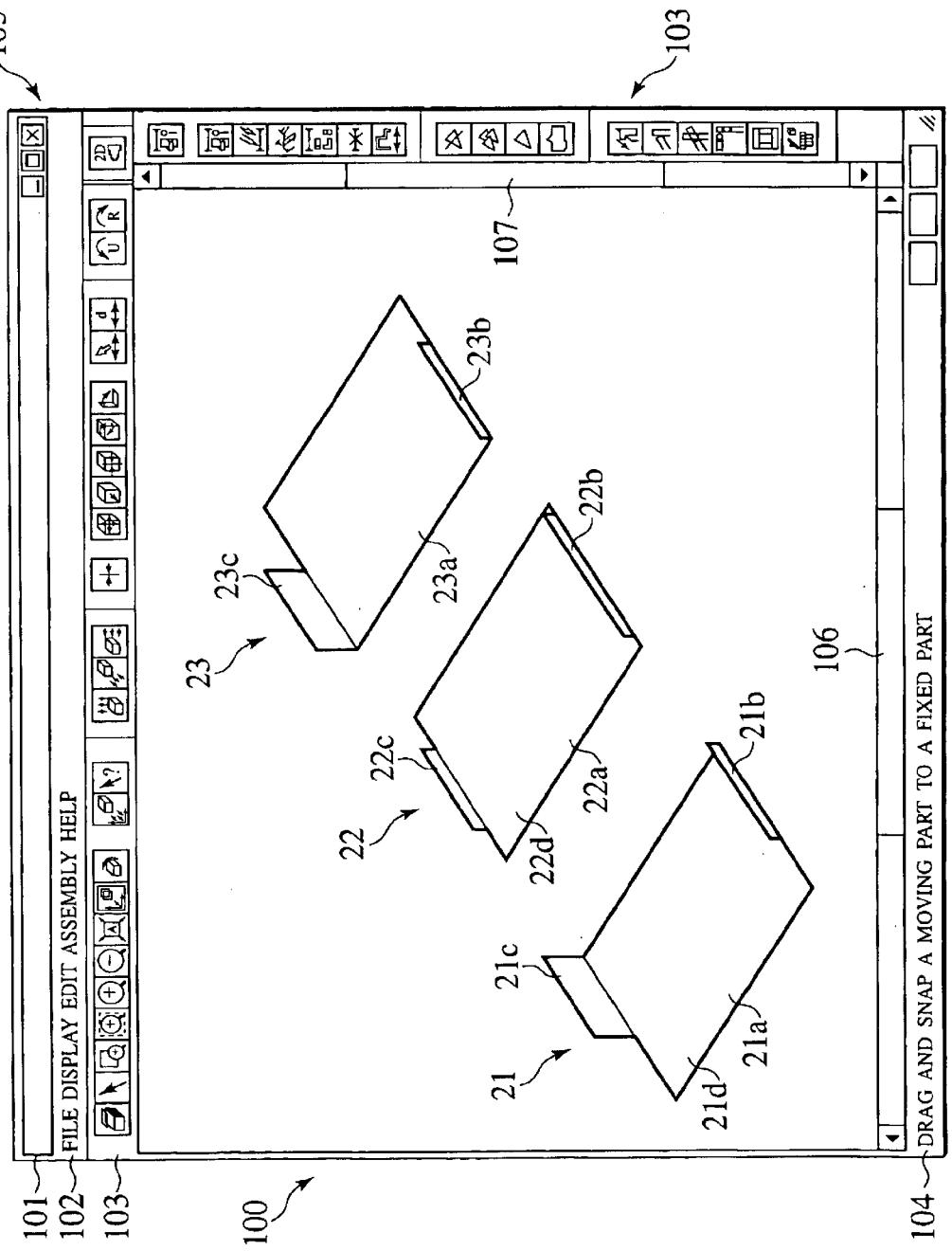
FIG. 15 shows a window displaying first to third parts to edit.

FIG. 15 shows the window 100 on the display 13 displaying first to third parts 21 to 23 to edit.

The first to third parts 21 to 23 of FIG. 15 are the same as those of FIG. 5 except the arrangement thereof. The status bar 104 displays a message "Drag and snap a moving part to a fixed part." The other parts of the window 100 are the same as those of FIG. 5, and therefore, are represented with like reference numerals to omit explanations thereof.

In step S41 of FIG. 14, navigation is carried out like step S31 of FIG. 4. The navigation automatically selects an element of a part under the cursor 31 and highlights the selected element.

Figure 16:
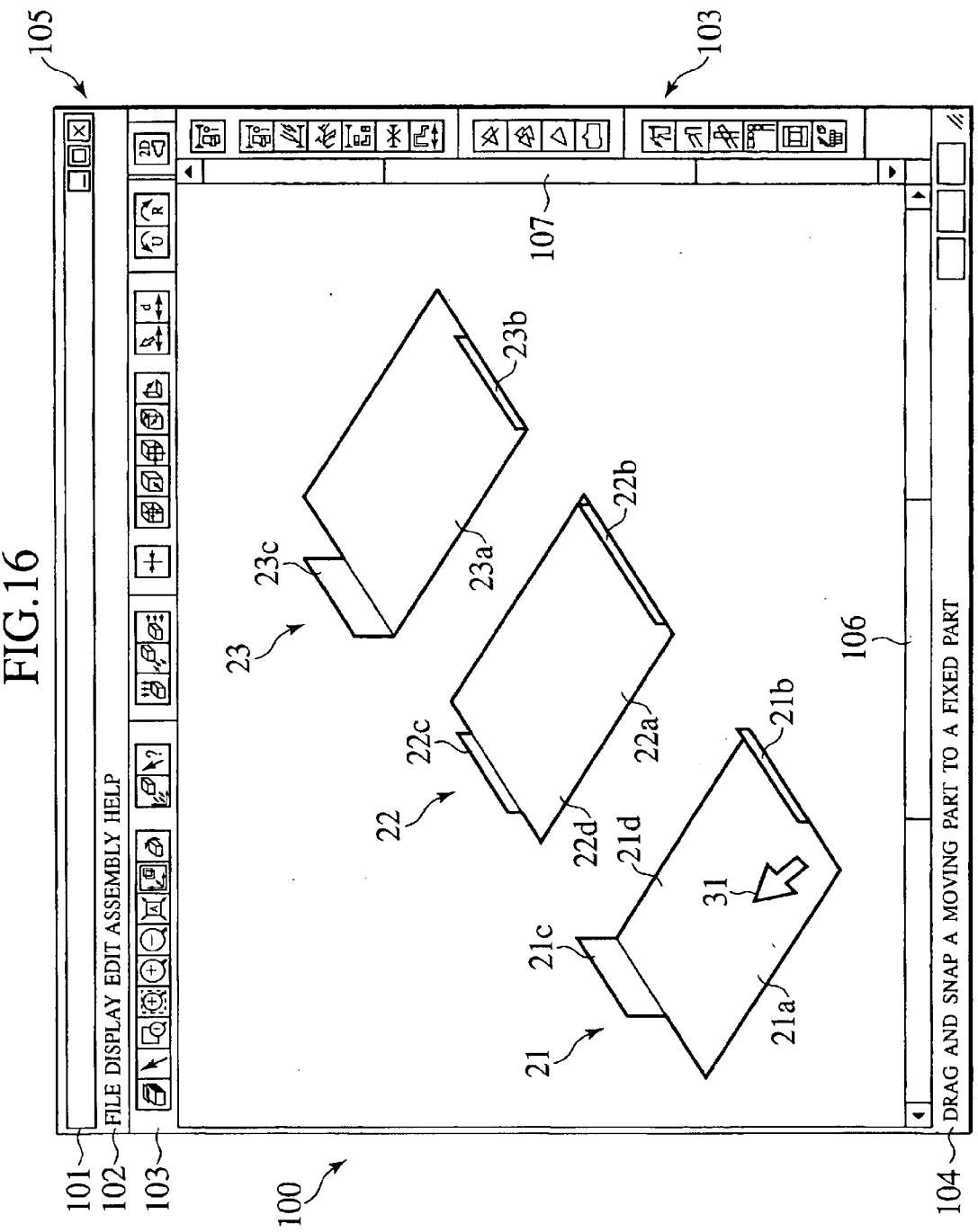
FIG. 16 shows a window displaying a face of the first part specified through navigation.

FIG. 16 shows the window 100 displaying a face selected as a reference element by navigation.

The cursor 31 is on the principal face 21a of the first part 21, and the principal face 21a is selected as a reference element through navigation.

Figure 17:
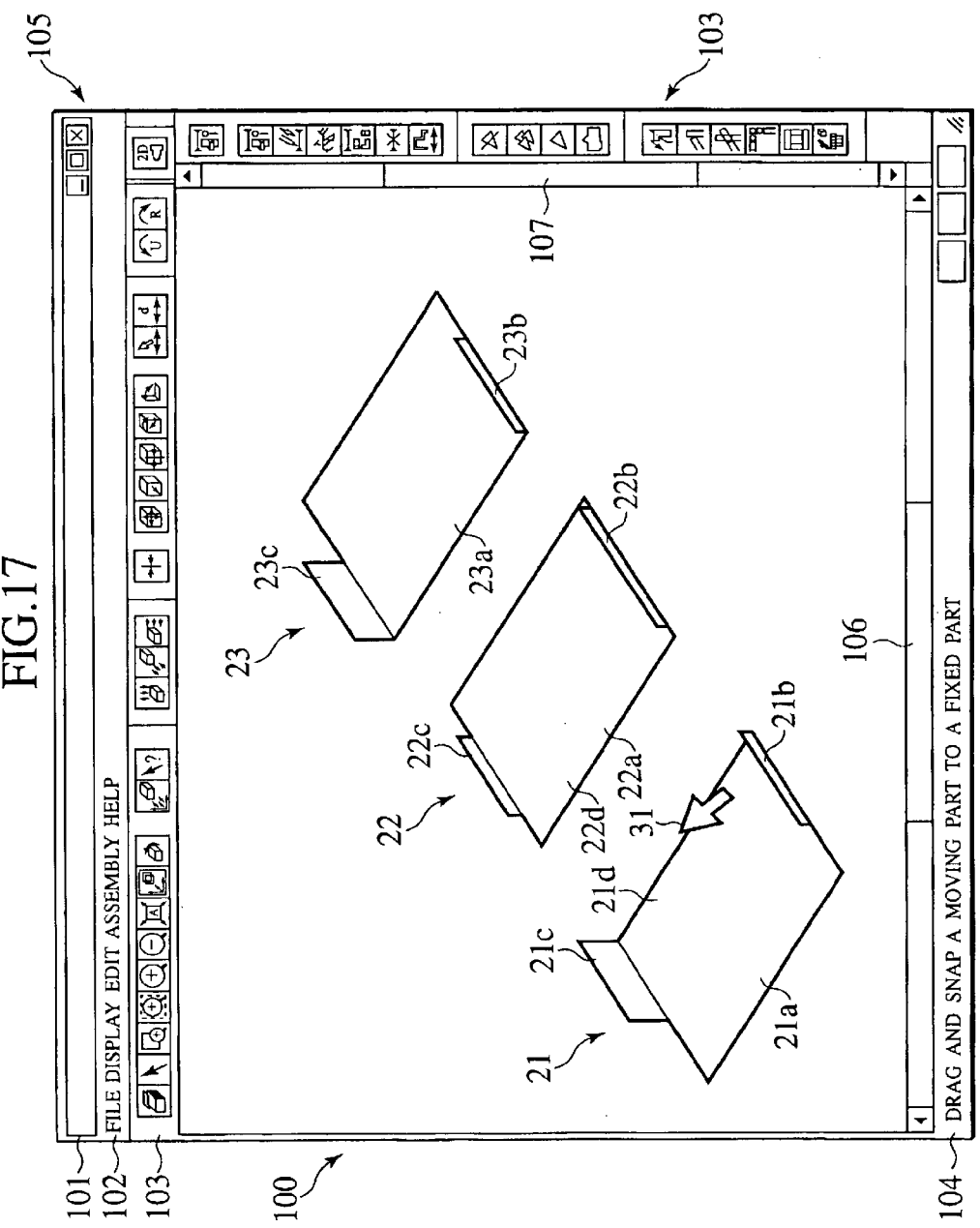
FIG. 17 shows a window displaying a line of the first part specified through navigation.

FIG. 17 shows the window 100 displaying a line selected as a reference element through navigation.

The cursor 31 is on a side line 21d of the principal face 21a of the first part 21, and the line 21d is selected as a reference element through navigation.

In step S42 of FIG. 14, a moving part and a reference element are specified like step S32 of FIG. 4. When an element is selected through navigation, the user may click the mouse 15 to specify the selected element as a reference element. At this time, the part that contains the reference element is selected as a moving part.

Figure 18:
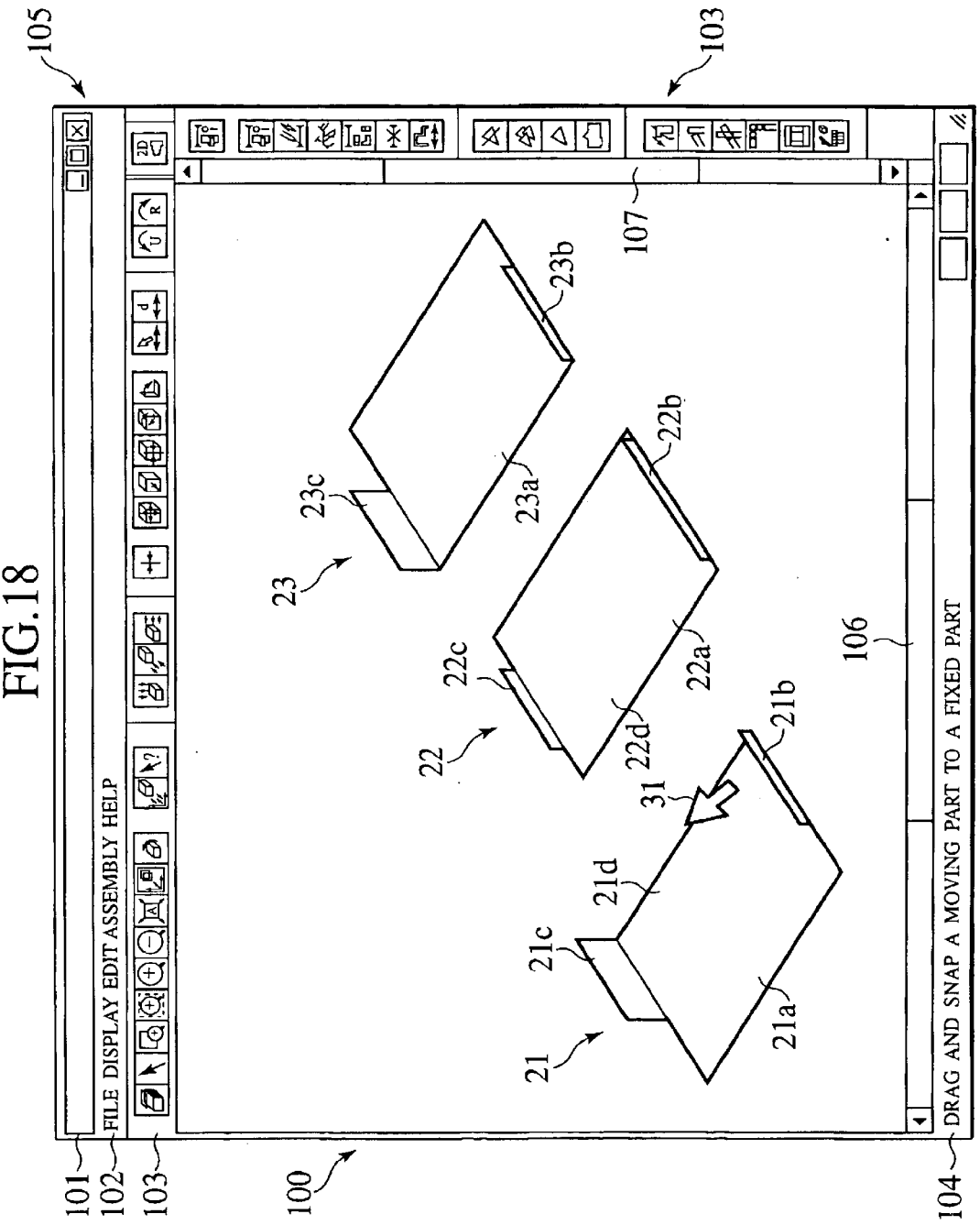
FIG. 18 shows a window displaying the first part specified as a moving part and a side line of the first part specified as a reference element.

FIG. 18 shows the window 100 displaying a specified moving part and reference element.

The cursor 31 is on the line 21d of the principal face 21a of the first part 21. The user clicks the mouse 15 to specify the line 21d as a reference element. At this time, the first part 21 containing the line 21d is selected as a moving part.

The line 21d specified as a reference element is highlighted, and the first part 21 specified as a moving part is highlighted and becomes translucent.

In step S43, the moving part specified in step S42 is dragged. As explained in steps S37 and S38 of FIG. 4, the user may horizontally or perpendicularly drag and move the moving part relative to the reference element.

In step S44, the central processor 11 checks to see if the moving part must be snapped to a fixed part. While the moving part is being dragged, an element of a fixed part is selected through navigation and the moving part is snapped to the fixed part so that the reference element of the moving part may attach to the selected element of the fixed part.

If the central processor 11 determines that the moving part can be snapped to a fixed part, step S45 is carried out, and if not, step S46 is carried out.

In step S45, the central processor 11 temporarily displays a snapped state of the moving part to the fixed part.

Figure 19:
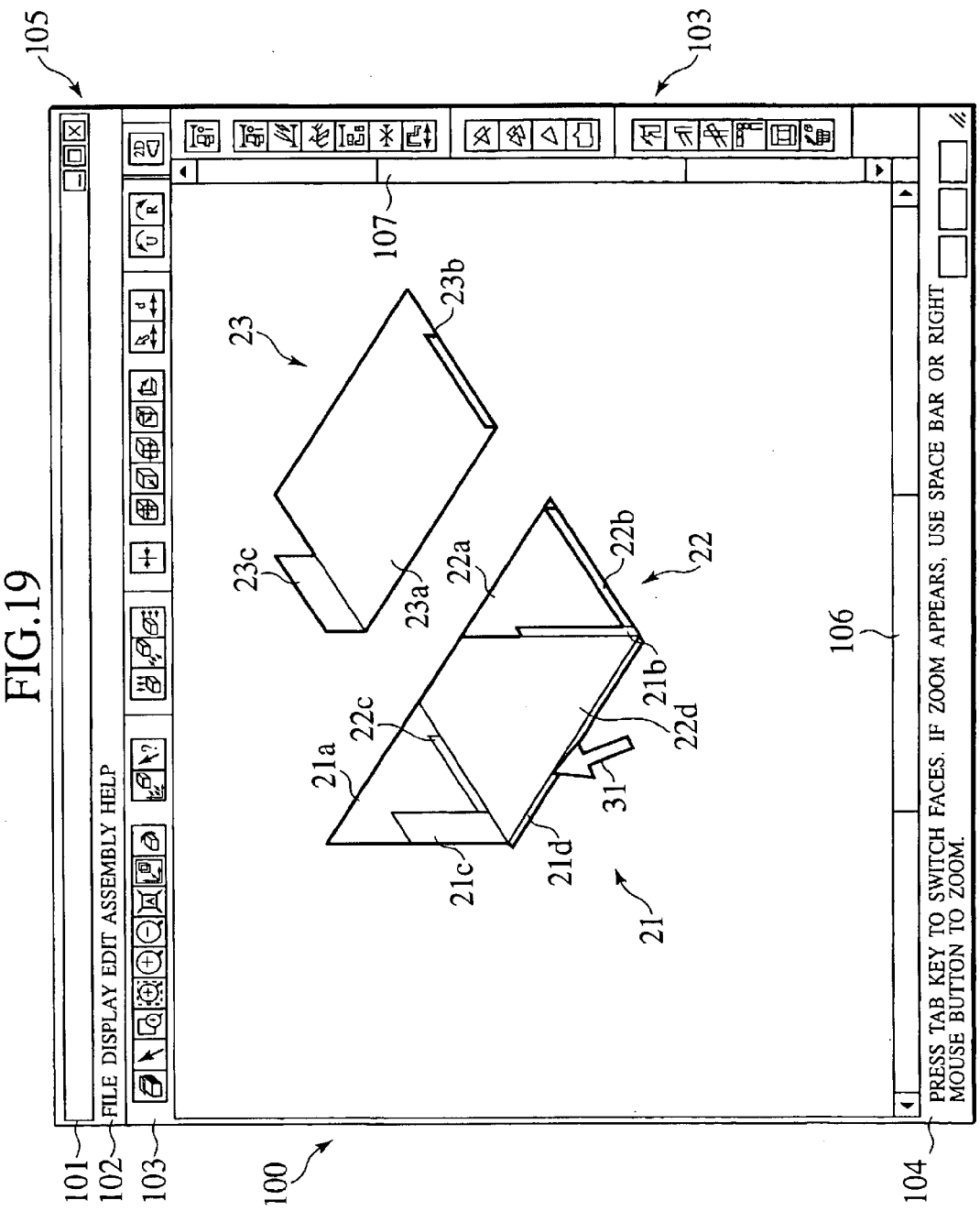
FIG. 19 shows a window displaying the moving part snapped to a fixed part.

FIG. 19 shows the window 100 displaying the moving part snapped to a fixed part.

The user drags, with the cursor 31, the first part 21, i.e. the moving part in parallel with the line 21d, i.e., the reference element, so that the line 21d may come on a line 22d of the principal face 22a of the second part 22.

When the cursor 31 is moved on the line 22d of the second part 22, the line 22d is selected by navigation. The navigation selects an element of a fixed part during the dragging of the moving part, and the reference element of the moving part is snapped to the selected element of the fixed part.

If the reference element of the moving part is a line and the element of the fixed part selected through navigation is a line, this embodiment attaches the moving part and fixed part to each other so that the faces that contain the lines make an angle of 90°.

In FIG. 19, the reference element is the line 21d and the navigation selected element is the line 22d. Therefore, the moving part, i.e., the first part 21 and the fixed part, i.e., the second part 22 are attached to each other so that the principal face 21a containing the line 21d of the first part 21 forms an angle of 90° relative to the principal face 22a containing the line 22d of the second part 22. This state is temporarily displayed in the window 100.

The status bar 104 displays a message "Press TAB key to switch faces. If ZOOM appears, use SPACE bar or right mouse button to zoom."

In step S46, the central processor 11 determines whether or not the moving part must be dropped.

The user may release the button of the mouse 15 dragging the moving part, to drop the moving part. Alternatively, the user may keep pressing the button of the mouse 15 to continue the dragging of the moving part.

If the user releases the button of the mouse 15, the central processor 11 determines that the moving part must be dropped and proceeds to step S47. If the user keeps pressing the button of the mouse 15, the central processor 11 determines that the dragging of the moving part must be continued and returns to step S43.

In step S47, the central processor 11 determines whether or not the moving part must be snapped to a fixed part. If it is determined not to snap the moving part to a fixed part, step S48 drops the moving part at the position without attaching the moving part to a fixed part.

More precisely, the user releases the pressed button of the mouse 15 in step S48, to drop the moving part at the present position.

If step S47 determines that the moving part must be snapped to a fixed part, step S49 displays an attachment dialog window 42 and carries out an operation of attaching the moving part to a fixed part.

Figure 20:
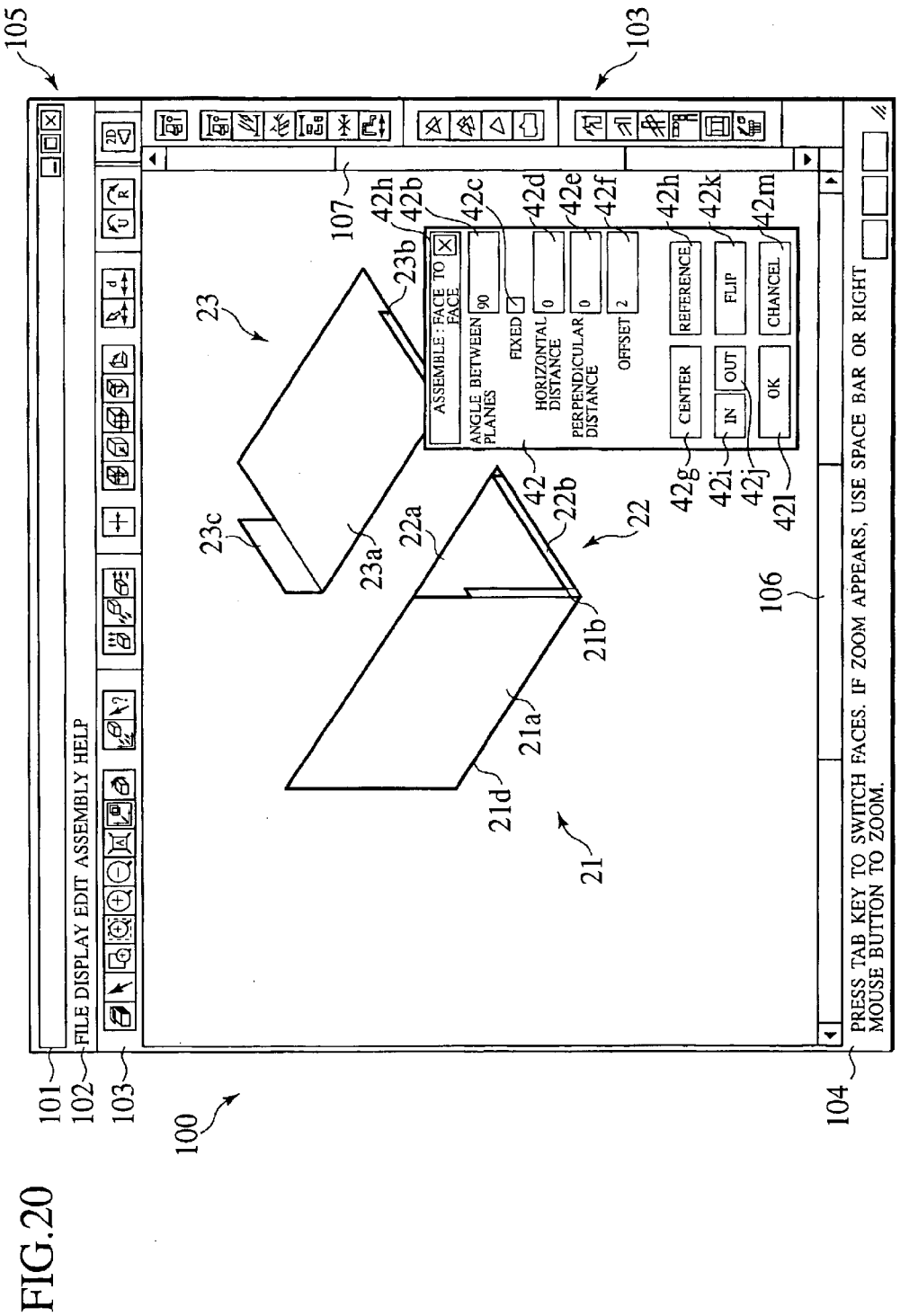
FIG. 20 shows a window displaying the moving part dropped onto the fixed part and an assembly dialog window.

FIG. 20 shows the window 100 displaying the moving part, i.e., the first part 21 to be snapped to a fixed part, i.e., the second part 22, and the attachment dialog window 42.

The dialog window 42 has a title bar 42a with a title "Assembly: line to line," an angle setting area 42b, a fix box 42c, a horizontal distance setting area 42d, a vertical distance setting area 42e, an offset setting area 42f, a center button 42g, a reference button 42h, a moving part button 42i, a fixed part button 42j, a flip button 42k, an OK button 421, a cancel button 42m, and a close button 42n.

The angle setting area 42b is used to set an angle between a face of the moving part and a face of the fixed part. The fix button 42c is checked when keeping the angle set in the angle setting area 42b as a fixed value. The horizontal distance setting area 42d is used to set a horizontal distance between the moving and fixed parts. The vertical distance setting area 42e is used to set a vertical distance between the moving and fixed parts. The offset setting area 42f is used to set an offset between the moving and fixed parts. The details of the horizontal distance, vertical distance, and offset will be explained later.

The center button 42g is used when attaching the moving and fixed parts to each other at the centers of their reference lines. The reference button 42h is used when attaching the moving and fixed parts to each other at end points of their reference lines.

The moving part button 42i is used to determine which of the inner and outer sides of the moving part is attached to the fixed part. The fixed part button 42j is used to determine which of the inner and outer sides of the fixed part is attached to the moving part. The flip button 42k is used to switch the orientations of the two faces of the moving and fixed parts to be attached to each other.

The OK button 421, cancel button 42m, and close button 42n function like those of the rotation dialog window 41 of FIG. 9, and therefore, will not be explained again.

FIGS. 21A to 21D explain an angle, a horizontal distance, a vertical distance, and an offset to be set in the dialog window 42.

Figure 21A:
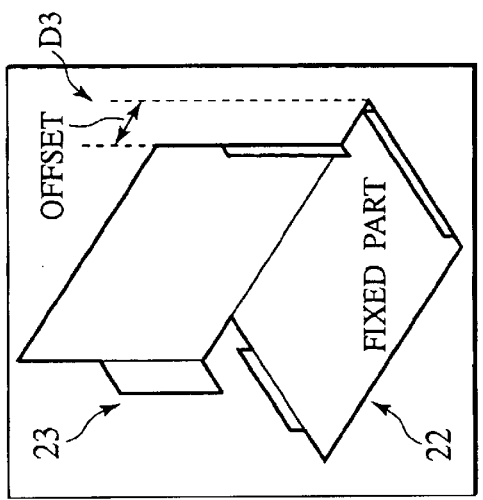
FIGS. 21A to 21D show windows explaining a face angle, a horizontal distance, a vertical distance, and an offset to be set with the assembly dialog window.

FIG. 21A explains an angle between the first part 21, i.e., the moving part and the second part 22, i.e., the fixed part.

The side line 21d of the principal face 21a of the first part 21 is attached to the side line 22d of the principal face 22a of the second part 22. An angle a is defined between the principal face 21a that contains the line 21d of the first part 21 and the principal face 22a that contains the line 22d of the second part 22.

The angle setting area 42b of the dialog window 42 has an initial angle of 90° This angle may be changed to an optional value. The value set in the angle setting area 42b may be fixed by checking the fix box 42c.

Figure 21D:
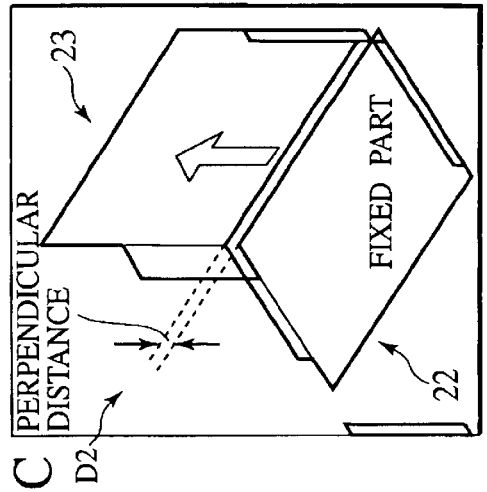
Figure 21B:
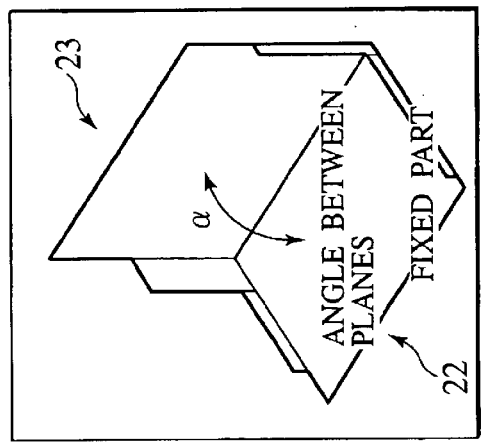

FIG. 21B explains a horizontal distance between the first part 21 and the second part 22.

The horizontal distance is a distance between the line 21d of the principal face 21a of the first part 21 and a plane that contains the principal face 22a containing the line 22d of the second part 22.

The horizontal distance setting area 42d of the dialog window 42 has an initial horizontal distance of 0. This distance may be changed to an optional value.

Figure 21C:
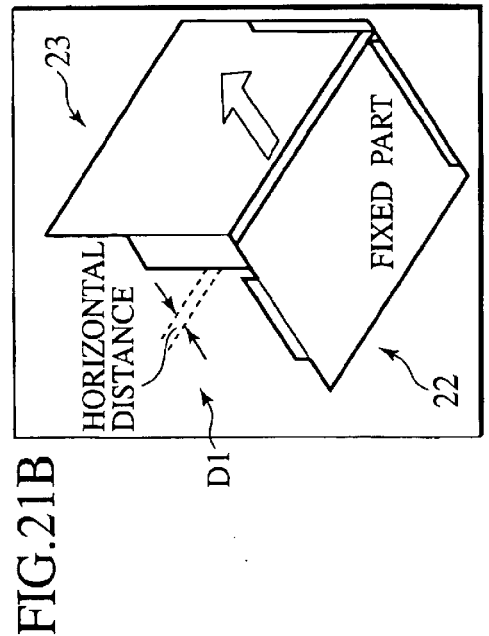

FIG. 21C explains a vertical distance between the first part 21 and the second part 22.

The vertical distance is a distance between a plane that contains the principal face 21a containing the line 21d of the first part 21 and the line 22d of the second part 22.

The vertical distance setting area 42e of the dialog window 42 has an initial vertical distance of 0. This distance may be changed to an optional value.

FIG. 21D explains an offset between the first part 21 and the second part 22.

The offset is a distance between a plane perpendicular to the line 21d of the first part 21 and containing an end point of the line 21d and a plane perpendicular to the line 22d of the second part 22 and containing an end point of the line 22d on the same side of the end point of the line 21d.

The offset setting area 42f of the dialog window 42 has an initial offset of 0. This offset may be changed to an optional value.

FIGS. 22A to 22D explain the center button 42g and reference button 42h of the dialog window 42.

In FIG. 22A, there are displayed a fourth part 24 serving as a fixed part and a fifth part 25 serving as a moving part. The fifth part 25 is attached to the fourth part 24 so that a side line 25a of a principal face of the fifth part 25 comes in contact with a side line 24a of a principal face of the fourth part 24.

FIG. 22B shows a result of pressing the center button 42g in the state of FIG. 22A.

When the center button 42g is pressed, the attached state of the fourth and fifth parts 24 and 25 of FIG. 22A is changed so that the lines 24a and 25a are attached to each other with the centers of the lines 24a and 25a aligned with each other as shown in FIG. 22B.

FIG. 22C shows a result of pressing the reference button 42h in the state of FIG. 22A.

When the reference button 42h is pressed, the attached state of the fourth and fifth parts 24 and 25 of FIG. 22A is changed so that the lines 24a and 25a are attached to each other with end points of the lines 24a and 25a on the same side aligned with each other as shown in FIG. 22C.

FIG. 22D shows a result of pressing the reference button 42h in the state of FIG. 22C.

When the reference button 42h is pressed, the end points with which the lines 24a and 25a are aligned are switched to the others as shown in FIG. 22D.

In this way, pressing the reference button 42h alternates the states of FIGS. 22C and 22D from one to another.

FIGS. 23A to 23D explain the flip button 42k of the dialog window 42.

The flip button 42k easily and intuitively switches attached states of two faces from one to another.

In FIG. 23A, the second and third parts 22 and 23 are attached to each other with the side line 22d of the principal face 22a of the second part 22 being aligned with the side line 23d of the principal face 23a of the third part 23.

FIG. 23B shows a result of pressing the flip button 42k in the state of FIG. 23A. The third part 23 is in a first state in FIG. 23A and is in a second state in FIG. 23B. The principal face 23a is in the same plane in the first and second states, and the line 23d is common to the first and second states.

FIG. 23C shows a result of pressing the flip button 42k in the state of FIG. 23B. In FIG. 23C, the third part 23 is in a third state. The principal face 23a is in the same plane in the first and third states, and the line 23d is common to the first and third states.

FIG. 23D shows a result of pressing the flip button 42k in the state of FIG. 23C. In FIG. 23D, the third part 23 is in a fourth state. The principal face 23a is in the same plane in the first and fourth states, and the line 23d is common to the first and fourth states.

FIGS. 24A to 24D explain the moving part button 42i and fixed part button 42j to determine a connection of two parts.

A connection of sheet-metal parts is determined according to the stability of an assembly formed from the parts and the welding method of the parts. The buttons 42i and 42j are useful to easily connect sheet-metal parts to each other.

In FIG. 24A, the moving part button 42i and fixed part button 42j are each IN. In this case, the moving part and fixed part are connected to each other on the inner faces thereof.

In FIG. 24B, the moving part button 42i is IN and the fixed part button 42j is OUT. In this case, the inner face of the moving part is connected to the outer face of the fixed part.

In FIG. 24C, the moving part button 42i is OUT and the fixed part button 24j is IN. In this case, the outer face of the moving part is connected to the inner face of the fixed part.

In FIG. 24D, the moving part button 42i and fixed part button 24j are each OUT. In this case, the outer faces of the moving and fixed parts are connected to each other.

Figure 25:
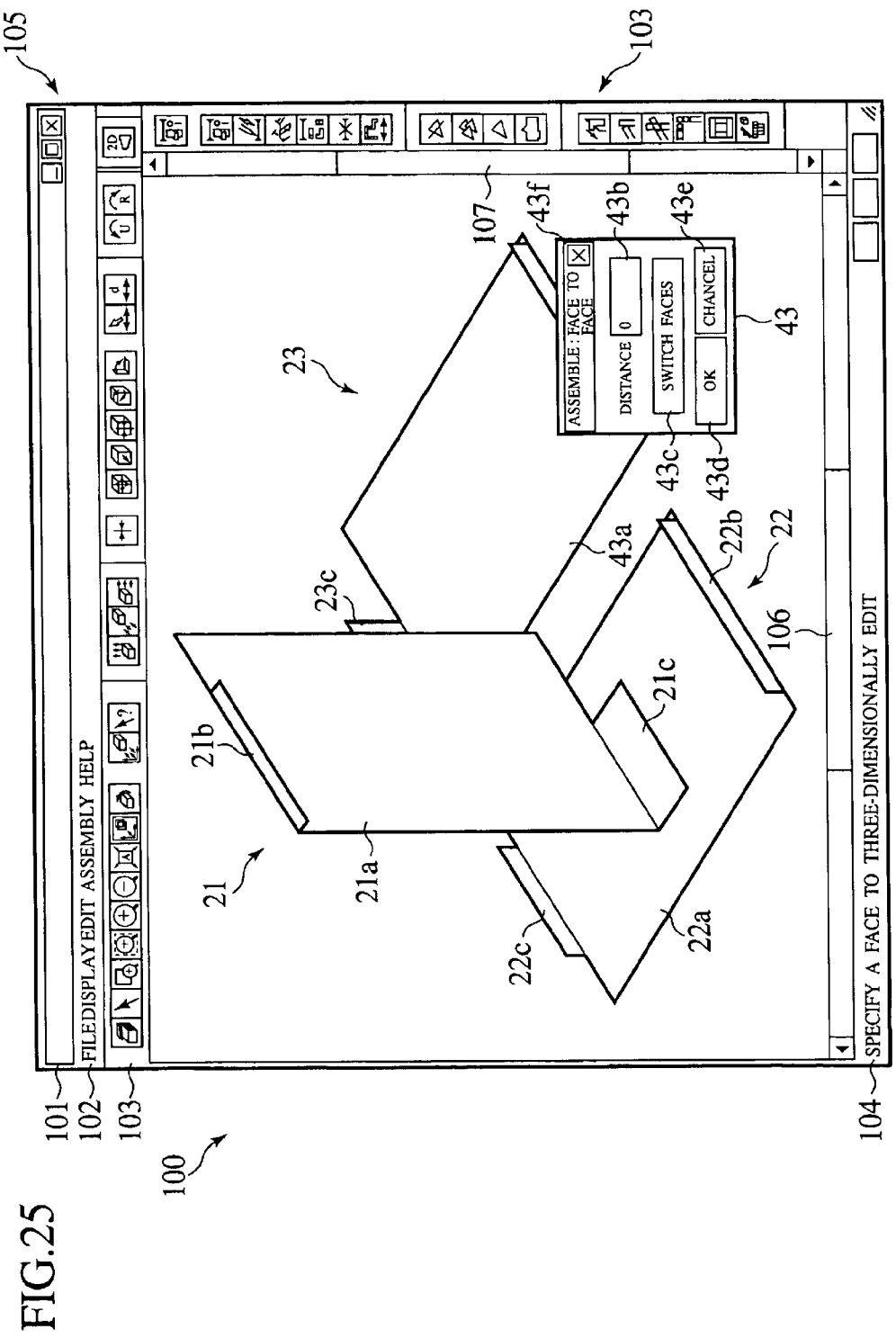
FIG. 25 shows a window displaying a second flange of principal face of the second part.

FIG. 25 shows the window 100 displaying the second flange 21c of the first part 21 snapped to the principal face 22a of the second part 22. This state corresponds to step S49 of FIG. 14.

The first part 21 having the second flange 21c is a moving part, and the second part 22 having the principal face 22a is a fixed part. The second flange 21c is snapped to the principal face 22a so that they are in parallel with each other and the centers thereof are aligned with each other. A dialog window 43 is displayed.

The dialog window 43 includes a title bar 43a with a title "Assembly: face to face," a distance setting area 43b, a face switching button 43c, an OK button 43d, a cancel button 43e, and a close button 43f.

The distance setting area 43b has an initial value of 0, which can be changed to set an optional distance between two faces. The face switching button 43c will be explained later. The OK button 43d, cancel button 43e, and close button 43f are the same as those explained before.

FIGS. 26A to 26D explain the distance setting area 43b and face switching button 43c of the dialog window 43.

The face switching button 43c is useful to easily edit an assembly. Based on the nature of sheet-metal parts that they substantially have a constant thickness, the face switching button 43c sequentially switches four connection states of FIGS. 26A to 26D from one to another.

Figure 26:
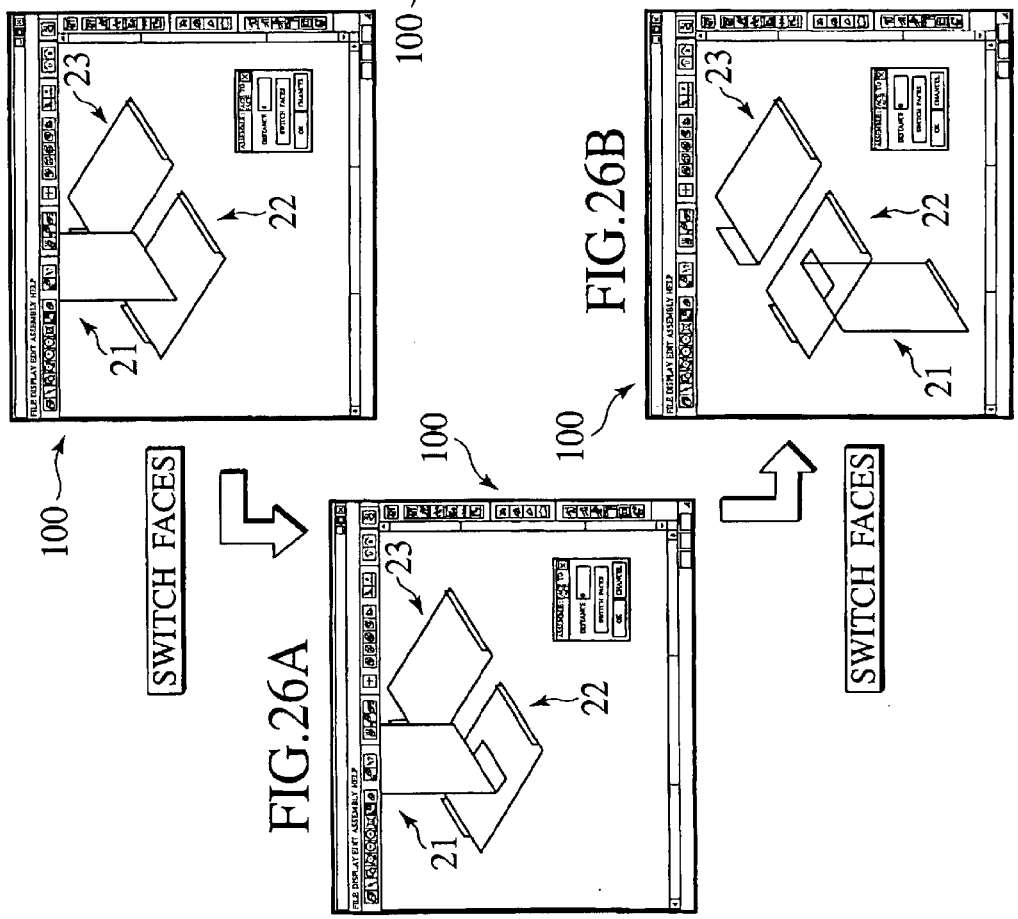
FIGS. 26A to 26D show windows explaining a distance setting area and a face switch button in a dialog window.

In FIG. 26A, the second Range 21c of the first part 21 is attached to the principal face 22a of the second part 22 with the second flange 21c being on the first part 21 side relative to the principal face 22a.

FIG. 26B shows a result of pressing the face switching button 43c in the state of FIG. 26A.

In FIG. 26B, the second flange 21c of the first part 21 is in the same state as in FIG. 26A. The principal face 21a of the first part 21, however, is opposite to the second flange 21c with the principal face 22a of the second part 22 interposing between the principal face 21a and the second flange 21c.

FIG. 26C shows a result of pressing the face switching button 43c in the state of FIG. 26B.

In FIG. 26C, the principal face 21a of the first part 21 is in the same state as in FIG. 26B. The second flange 21c of the first part 21, however, is on the principal face 21a side relative to the principal face 22a of the second part 22.

FIG. 26D shows a result of pressing the face switching button 43c in the state of FIG. 26C.

In FIG. 26D, the second flange 21c of the first part 21 is in the same state as in FIG. 26C. The principal face 21a of the first part 21, however, is opposite to the second flange 21c with the principal face 22a of the second part 22 interposing between the principal face 21a and the second flange 21c.

If the face switching button 43c is pressed in the state of FIG. 26D, the state of FIG. 26A is provided.

The part attaching sequence explained above attaches a single part to another single part, for the sake of simplicity of explanation. The part attaching sequence according to the embodiment is applicable to attach a group of parts or a component consisting of one or a plurality of parts to another part, part group, or component.

To attach a group of parts to a fixed group or part an element contained in the group of parts is selected through navigation, the group that contains the selected element is selected as a moving group, and the moving group is attached to the fixed group or part.

Figure 27:
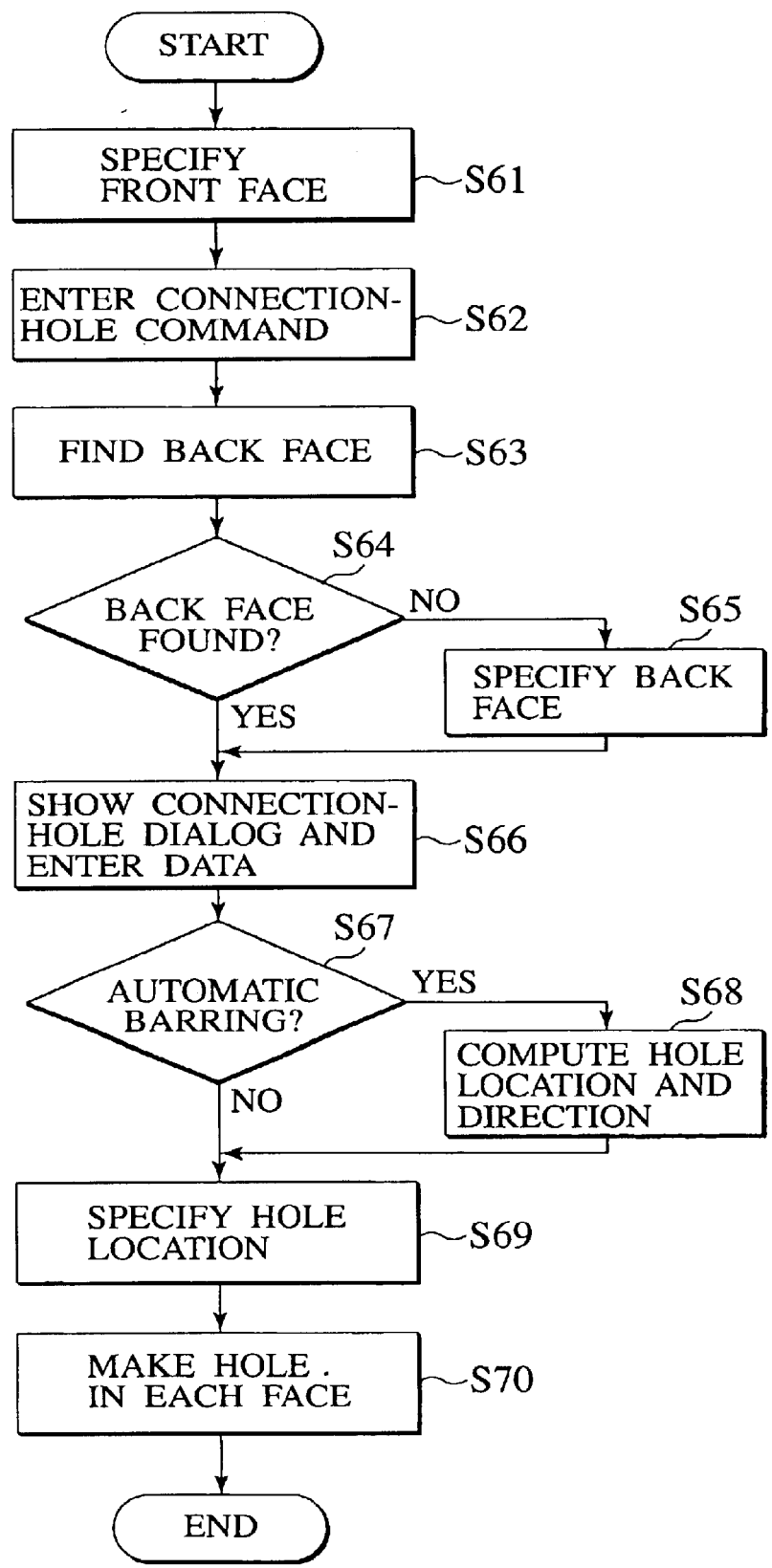
FIG. 27 is a flowchart showing a sequence of forming connection holes.

FIG. 27 is a flowchart showing a sequence of forming connection holes on sheet-metal parts. The sequence is achieved according to the assembly software 12b stored in the storage device 12.

The sequence includes selecting a first part in which a connection hole is formed, selecting a first face from the first part and setting a type of the connection hole to be formed in the first face, setting a location of the connection hole on the first face, and finding a second face of a second part corresponding to the first face.

The sequence automatically finds a second face of a second part corresponding to a first face of a first part. The first face is called a front face and the second face is called a back face corresponding to the front face. The sequence easily forms connection holes including a combination of a projection such as burring and a recess on two faces.

The sequence is started when the user enters a connection hole command in a command line, or when the user presses a connection hole command button in the GUI on the display 13.

Figure 28:
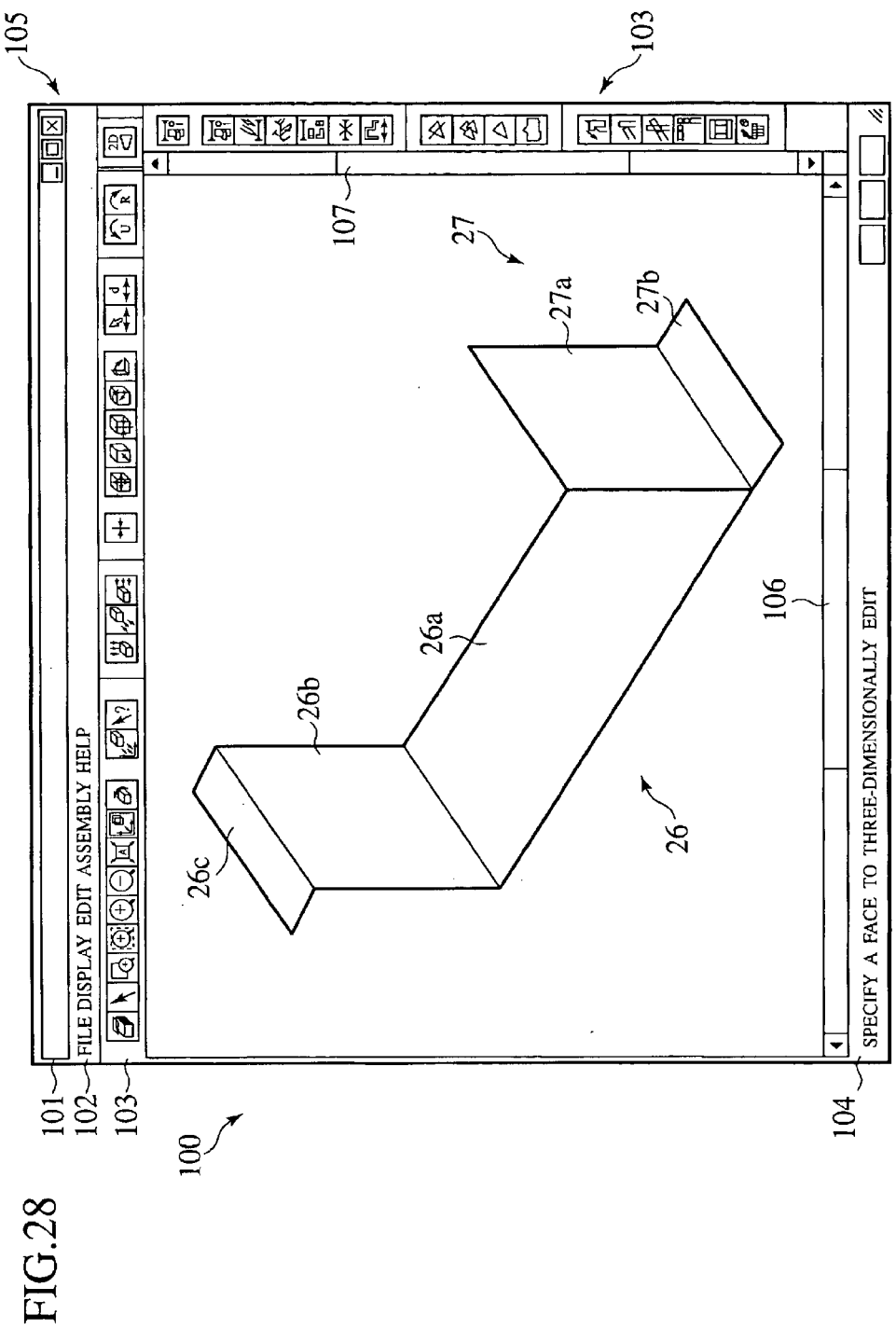
FIG. 28 shows a window displaying sixth and seventh parts to edit.

FIG. 28 shows the window 100 on the display 13 displaying a sixth part 26 and a seventh part 27 to edit.

The sixth part 26 is a sheet-metal part and has a rectangular principal face 26a, a rectangular first flange 26b vertically formed at an end of the principal face 26a, and a rectangular second flange 26c vertically formed at an end of the first flange 26b.

The seventh part 27 is a sheet-metal part and has a rectangular principal face 27a and a flange 27b vertically formed at an end of the principal face 27a.

Part of the principal face 26a of the sixth part is connected to the flange 27b of the seventh part 27.

In the window 100, the status bar 104 displays a message "Specify a face to three-dimensionally edit" to prompt the user to specify a face. The other parts of the window 100 are the same as those of FIG. 5, and therefore, are represented with like reference numerals to omit their explanations.

In step S61 of FIG. 27, the user specifies a face in which a connection hole is formed. The specified face serves as a front face and is highlighted.

Figure 29:
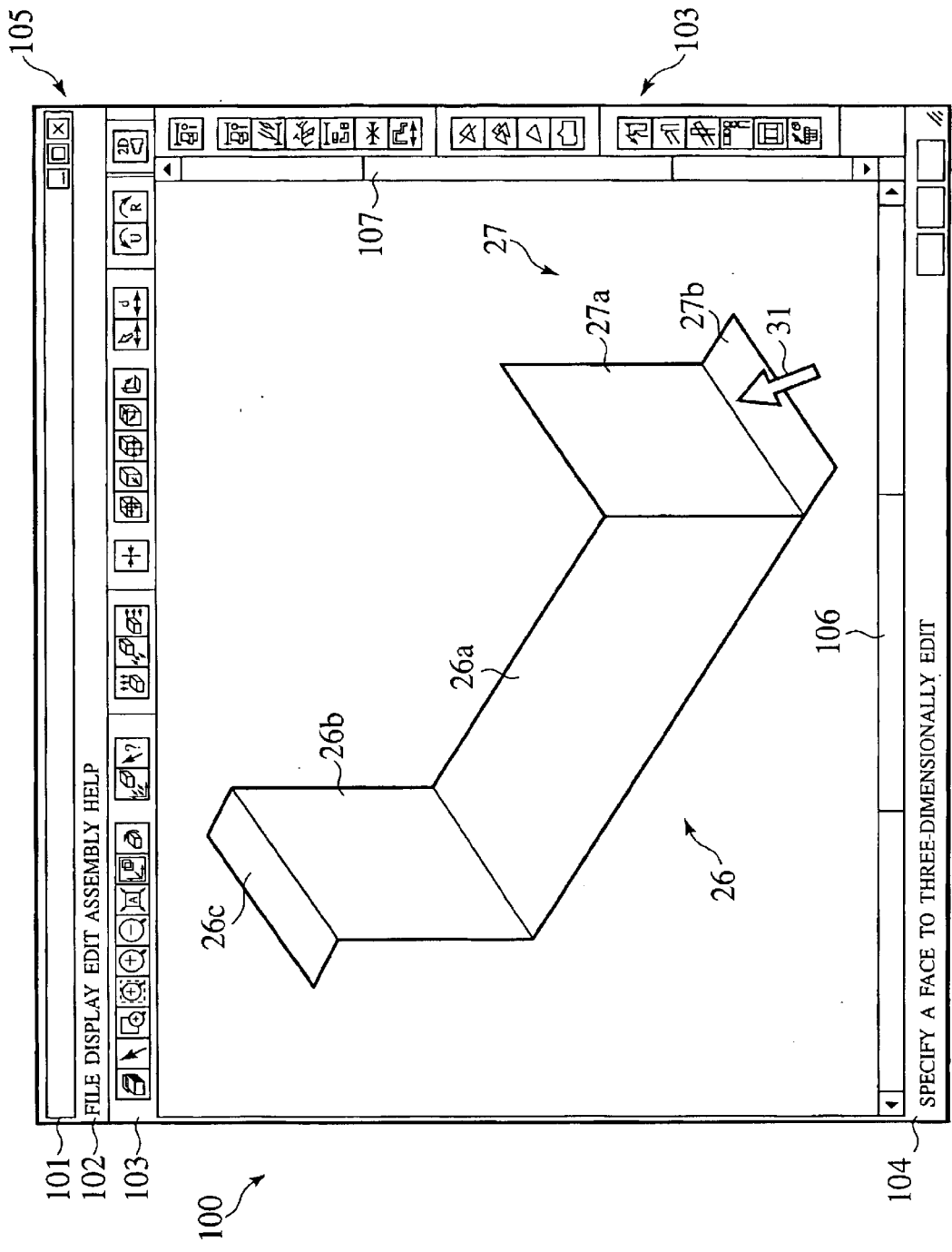
FIG. 29 shows a window displaying an operation of specifying a front face of connection.

FIG. 29 shows the window 100 displaying the specified front face.

The user positions the cursor 31 on the flange 27b of the seventh part 27 and clicks the mouse 15 to specify the flange 27b as a front face, which is highlighted.

In step S62, the user enters a connection hole command in a command line, or presses a connection hole command button in the GUI on the display 13.

In step S63, the central processor 11 tries to find a back face corresponding to the front face. The back face is a face in which a hole corresponding to the connection hole formed in the front face is formed.

In step S64, the central processor 11 determines whether or not the back face has been found. If it has been found, step S66 is carried out, and if not, step S65 is carried out.

Figure 30:
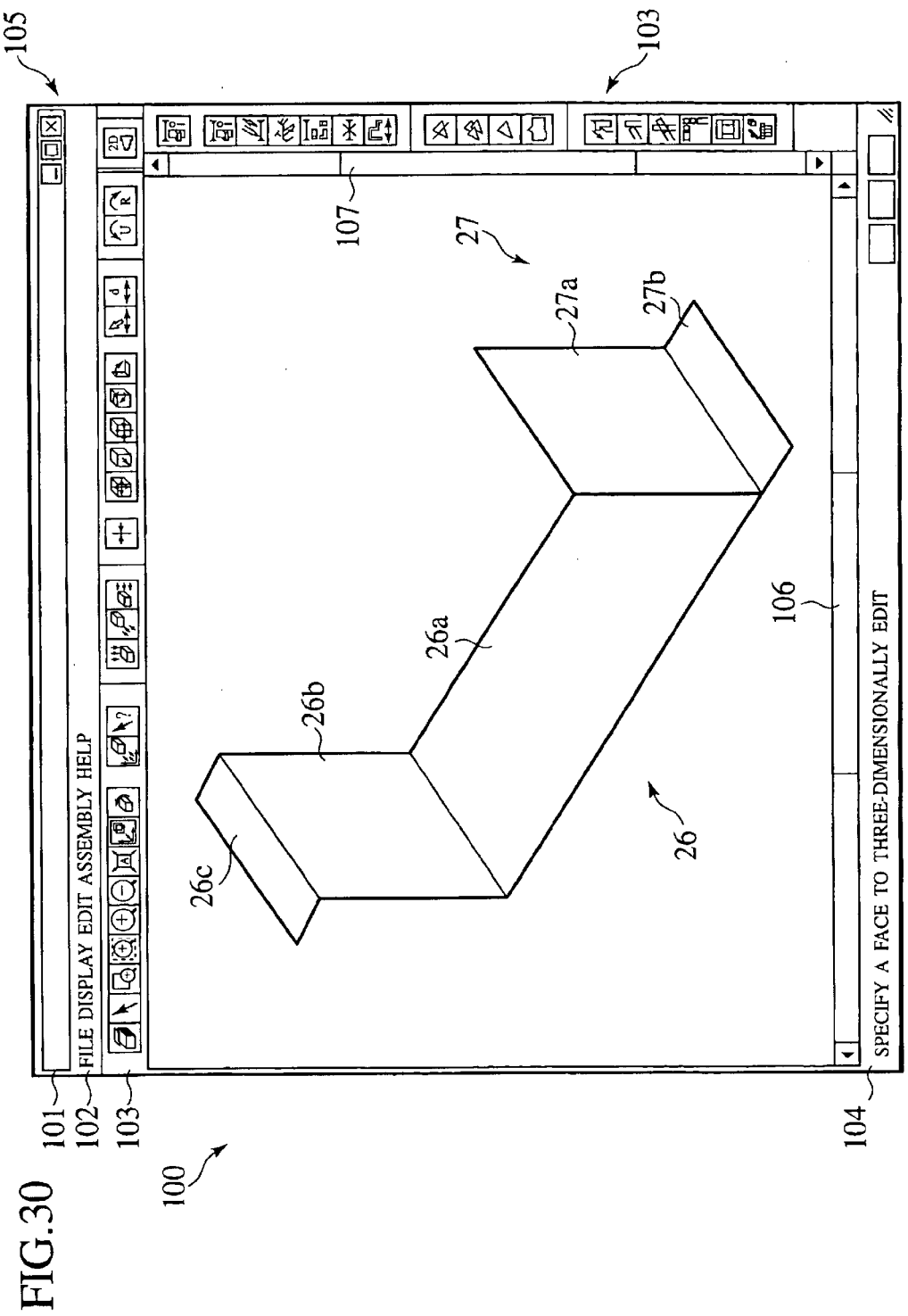
FIG. 30 shows a window displaying a found back face of connection.

FIG. 30 shows the window 100 displaying a found back face.

The flange 27b of the seventh part 27, i.e., the front face is connected to the principal face 26a of the sixth part 26. When a connection hole is formed in the flange 27b of the seventh part 27, a corresponding connection hole is formed in the principal face 26a of the sixth part 26, and therefore, the principal face 26a of the sixth part 26 is the back face corresponding to the front face.

The central processor 11 follows a given algorithm to find the principal face 26a of the sixth part 26 as the back face and highlights the found back face.

If the central processor 11 is unable to find a proper back face in step S64, the user must specify the back face in step S65. At this time the status bar 104 displays a message to prompt the user to specify a back face.

In response to the message, the user moves the cursor 31 onto a proper face and clicks the mouse 15 to specify the face as the back face, which is highlighted.

In step S66, the central processor 11 displays a connection hole dialog window 44 in the window 100.

Figure 31:
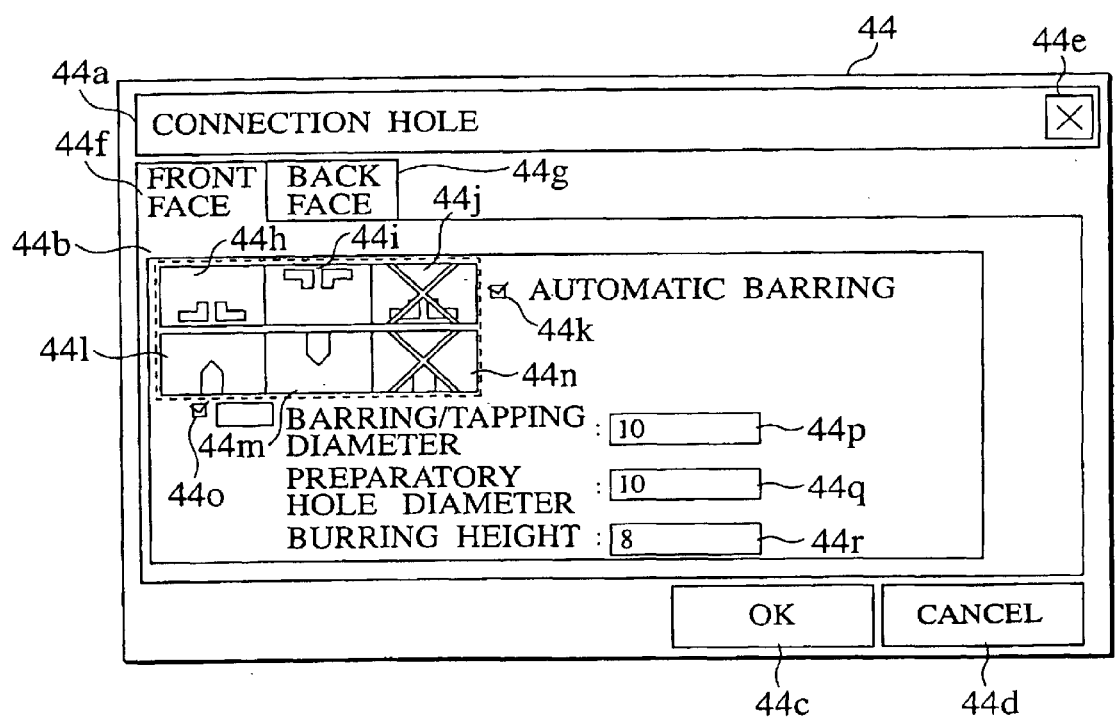
FIG. 31 shows a connection hole dialog window.

FIG. 31 shows the connection hole dialog window 44.

The dialog window 44 includes a title bar 44a with a title "Connection hole," a setting area 44b, an OK button 44c, a cancel button 44d, and a close button 44e. The title bar 44a, OK button 44c, cancel button 44d, and close button 44e are the same as those explained above, and therefore, will not be explained again.

The setting area 44b includes a front tab 44f, a back tab 44g, an upward barring button 44h, a downward barring button 44i, a no-burring button 44j, an upward tapping button 44l, a downward tapping button 44m, and a no-tapping button 44n.

The front tab button 44f is pressed to carry out the setting of the front face, and the back tab button 44g is pressed to carry out the setting of the back face. The upward burring button 44h, downward burring button 44i, and no-burring button 44j are used to set burring conditions. The upward tapping button 44l, downward tapping button 44m, and no-tapping button 44n are used to set tapping conditions.

The setting area 44b also has an automatic burring box 44k, a preparatory hole box 44o, a burring/tapping diameter setting area 44p, a preparatory hole diameter setting area 44q, and a burring height setting area 44r.

If the automatic burring box 44k is checked, a combination of front-face burring and a back-face hole is determined only by specifying one of the front and back faces. The preparatory hole box 44o is used to determine whether or not a preparatory (circular) hole is needed. The user may position the cursor 31 on any one of the check boxes and click the mouse 15 to enter or erase a check mark in the check box.

In step S67, the central processor 11 determines whether or not the automatic burring must be carried out. If the automatic burring box 44k is checked, the automatic burring is carried out.

If the automatic burring must be carried out, step S68 is carried out, and if not, step S69 is carried out.

Figure 32:
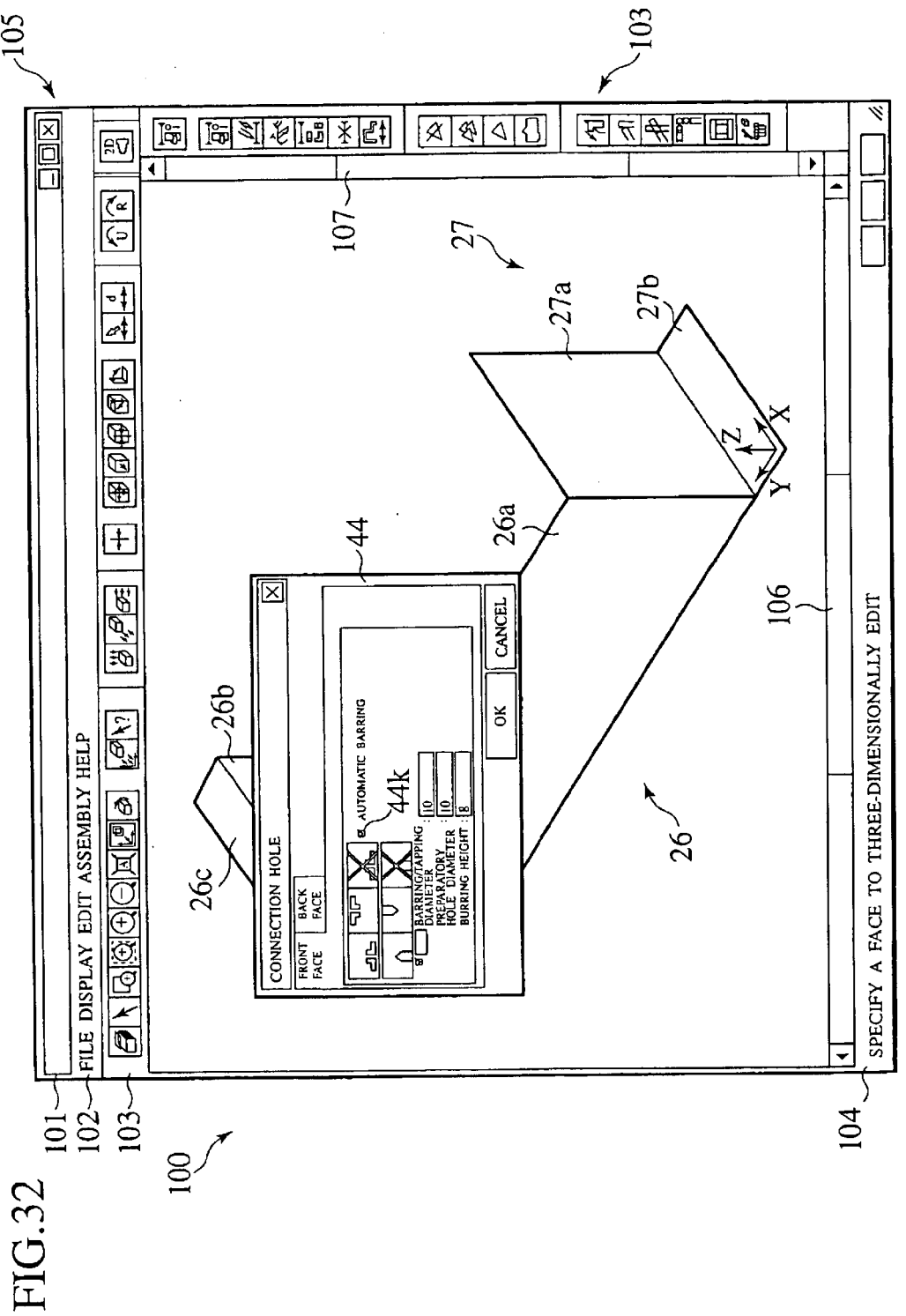
FIG. 32 shows a window displaying the setting of automatic burring on the front face.

FIG. 32 shows the widow 100 displaying the automatic burring carried out on the front face.

The user positions the cursor 31 on the automatic burring box 44 in the dialog window 44 and clicks the mouse 15, to enable the automatic burring.

In step S68, the central processor 11 computes a face and an orientation to make burring, tapping, or a hole according to values entered in the dialog window 44 and a predetermined method.

In step S69, a position to form the connection hole is determined.

Figure 33:
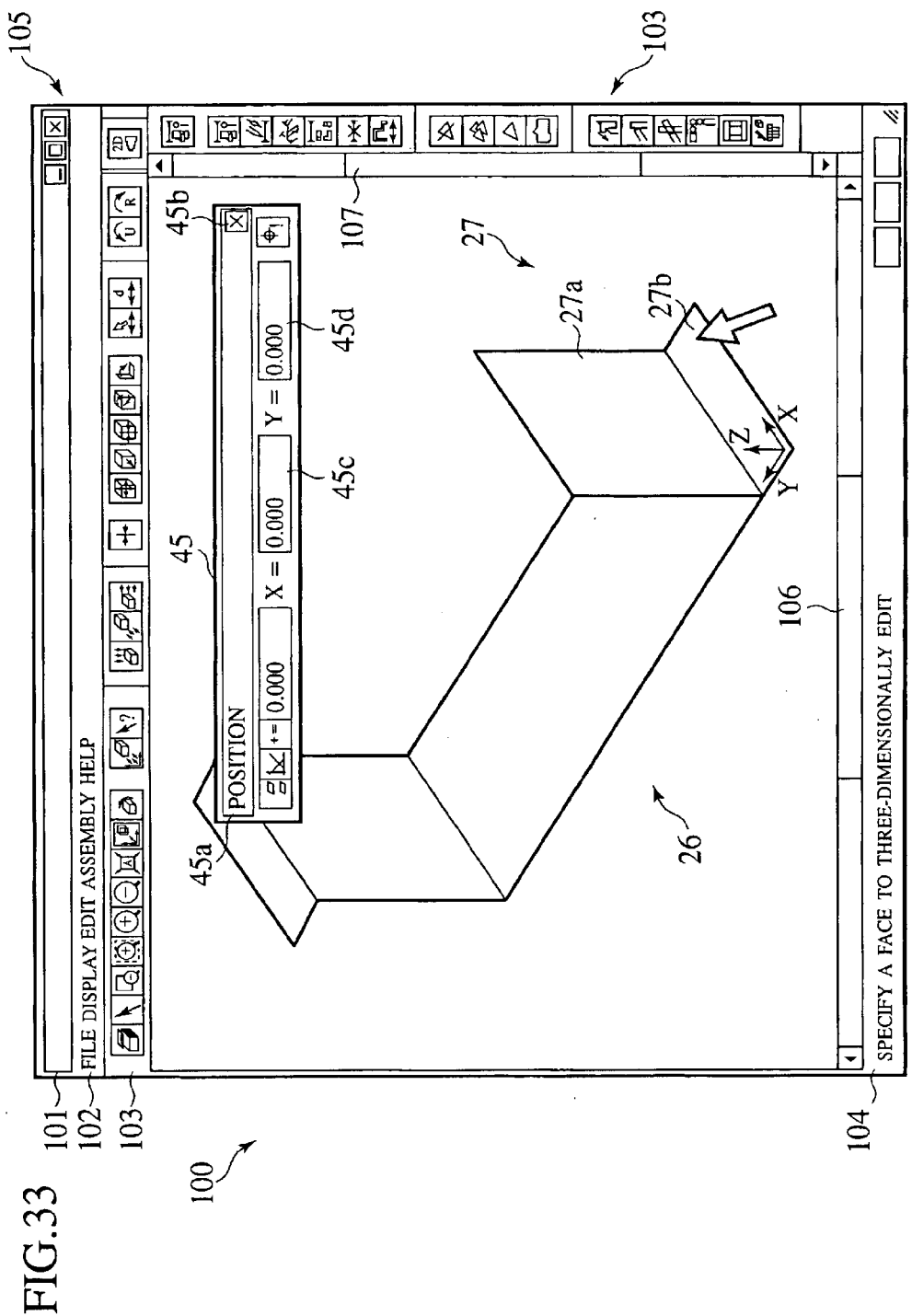
FIG. 33 shows a window displaying a hole location dialog window.

FIG. 33 shows the window 100 displaying a hole position dialog window 45.

The dialog window 45 has a title bar 45a with a title "Position," a close button 45b, an X-coordinate setting area 45c, and a Y-coordinate setting area 45d.

The X-coordinate setting area 45c is used to set an X-coordinate of the center of the connection hole. The Y-coordinate setting area 45d is used to set a Y-coordinate of the center of the connection hole. The X- and Y-coordinates of the connection hole are based on, for example, an XYZ-coordinate system having an origin at a corner of the flange 27b of the seventh part 27.

The user enters values in the X- and Y-coordinate setting areas 45c and 45d, to position the connection hole at a required location.

In step S70, the central processor 11 forms the connection hole. Namely, the central processor 11 forms the connection hole on the front and back faces at the position set in step S69.

Figure 34:
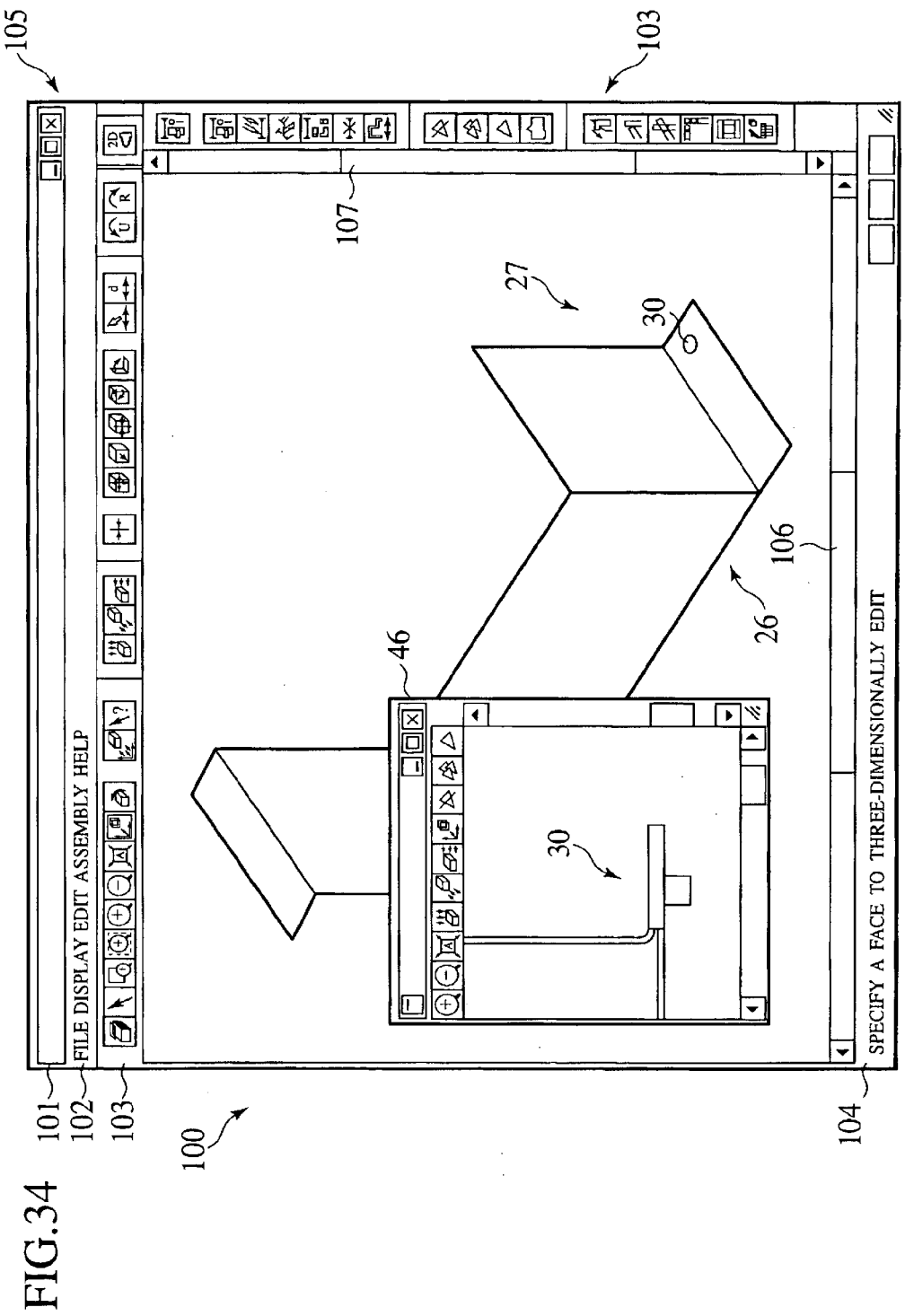
FIG. 34 shows a window displaying connection holes formed on the front and back faces.

FIG. 34 shows the window 100 displaying the formed connection hole 30.

The flange 27b of the seventh part 27, i.e., the front face and the principal face 26a of the sixth part 26, i.e., the back face are connected together through the connection hole 30.

The window 100 of FIG. 34 includes a window 46 that displays the connected state of the flange 27b and principal face 26a around the connection hole 30 seen from a different direction.

FIG. 35 shows the window 100 displaying the connection hole 30 on the sixth and seventh parts 26 and 27 that are separated from each other.

The flange 27b of the seventh part 27, i.e., the front face is provided with burring 30a, and the principal face 26a of the sixth part 26, i.e., the back face is provided with a flat hole (circular hole) 30b. The burring 30a and flat hole 30b constitute, in combination, the connection hole 30.

The present invention may be embodied in other specific forms without departing from the spirit or essential characteristics thereof. The embodiments are therefore to be considered in all respects as illustrative and not restrictive. The present invention is applicable to components and parts having various shapes. The windows 100, 41, and the like shown in the accompanying drawings are only examples and are not intended to restrict the scope of the present invention.

As explained above, the present invention specifies a reference element through navigation and easily moves a part relative to the reference element. The present invention specifies a moving part and a target element through navigation and easily attaches to the moving part to the target element.

The present invention enables the user to easily edit an assembly composed of sheet-metal parts with CAD.

What is claimed is:

1. A method of editing an assembly with CAD, comprising:
   reading parts data defining parts that are made of sheet metal and are assembled into the assembly;
   reading attachment data defining attachment relationships among the parts;
   reading edit data defining edit states of the parts;
   reading assembling data defining an assembling sequence of the parts; and
   assembling the parts into the assembly according to the parts data, attachment data, edit data, and assembling data.
2. The method of claim 1, wherein
   the attachment data includes at least one of distance data, angle data, and connection data concerning the parts.
3. The method of claim 1, wherein
   the edit data includes at least one of connection-hole position data and connection-hole shape data concerning the parts.
4. The method of claim 1, wherein
   the parts include single parts and components, each component being made of a plurality of single parts.
5. The method of claim 4, wherein
   the assembling data includes data to assemble a component from single parts.
6. The method of claim 1, further comprising:
   reading attribute data defining attributes of the parts, the attribute data, parts data, attachment data, edit data, and assembling data being used to assemble the parts into the assembly.
7. The method of claim 6, wherein
   the attribute data includes data defining colors of the parts.
8. A method of editing an assembly with CAD, comprising:
   saving parts data defining parts that are made of sheet metal and are assembled into the assembly;
   saving attachment data defining attachment relationships among the parts;
   saving edit data defining edit states of the parts; and
   saving assembling data defining an assembling sequence of the parts.
9. The method of claim 8, wherein
   the attachment data includes at least one of distance data, angle data, and connection data concerning the parts.
10. The method of claim 8, wherein
    the edit data includes at least one of connection-hole position data and connection-hole shape data concerning the parts.
11. The method of claim 8, wherein
    the parts include single parts and components, each component being made of a plurality of single parts.
12. The method of claim 11, wherein
    the assembling data includes data to assemble a component from single parts.
13. The method of claim 8, further comprising:
    saving attribute data defining attributes of the parts.
14. The method of claim 13, wherein
    the attribute data includes data defining colors of the parts.
15. A method of editing an assembly with CAD, comprising:
    selecting, through navigation, a first element of a first part among parts displayed on a CAD screen, the parts being made of sheet metal and being assembled into the assembly, the navigation automatically selecting an element of a part under a cursor as the cursor is moved on the CAD screen; and
    dragging the first part including the first element with the cursor in one of horizontal and perpendicular directions relative to the first element.
16. The method of claim 15, wherein
    the parts include single parts and components, each component being made of a plurality of single parts.
17. The method of claim 15, wherein
    the first element includes one of a line or a face.
18. The method of claim 17, comprising:
    rotating the first part around the first element.
19. The method of claim 18, comprising:
    rotating the first part around a line or a normal to a face of the first part.
20. The method of claim 15, comprising:
    flipping the first part relative to the first element.
21. The method of claim 15, further comprising:
    selecting, through navigation, a second element of a second part among the parts displayed on the CAD screen; and
    attaching the first element of the first part to the second element of the second part.
22. The method of claim 21, wherein
    the second element includes one of a line or a face.
23. The method of claim 22, wherein
    the first and second elements are faces, respectively.
24. The method of claim 21, further comprising:
    setting an attaching state of the first and second elements.
25. The method of claim 24, wherein
    the operation of setting an attaching state sets at least one of the distance, angle, and connection of the first and second parts.
26. The method of claim 24, wherein
    the operation of setting an attaching state displays a dialog window and is carried out through the dialog window.
27. A method of editing an assembly with CAD, comprising:
    selecting a first part in which a connection hole is formed among parts that are made of sheet metal and are assembled into the assembly;
    selecting a first face from the first part and setting a type of the connection hole to be formed in the first face;
    setting a location of the connection hole on the first face; and
    finding a second face of a second part corresponding to the first face.
28. The method of claim 27, wherein
    the operation of setting a type of the connection hole includes choosing a type of the connection hole from a group including burring and tapping.

29. The method of claim 27, wherein
the operations of setting the type and location of the connection hole display a dialog window and are carried out through the dialog window.

30. A computer readable medium containing software of editing an assembly with CAD, wherein the software comprising:
reading parts data defining parts that are made of sheet metal and are assembled into the assembly;
reading attachment data defining attachment relationships among the parts;
reading edit data defining edit states of the parts;
reading assembling data defining an assembling sequence of the parts; and
assembling the parts into the assembly according to the parts data, attachment data, edit data, and assembling data.

31. The computer readable medium of claim 30, wherein the attachment data includes at least one of distance data, angle data, and connection data concerning the parts.

32. The computer readable medium of claim 30, wherein the edit data includes at least one of connection-hole position data and connection-hole shape data concerning the parts.

33. The computer readable medium of claim 30, wherein the parts include single parts and components, each component being made of a plurality of single parts.

34. The computer readable medium of claim 33, wherein the assembling data includes data to assemble a component from single parts.

35. The computer readable medium of claim 30, wherein the software further comprising:
reading attribute data defining attributes of the parts, the attribute data, parts data, attachment data, edit data, and assembling data being used to assemble the parts into the assembly.

36. The computer readable medium of claim 35, wherein the attribute data includes data defining colors of the parts.

37. A computer readable medium containing software of editing an assembly with CAD, wherein the software comprising:
saving parts data defining parts that are made of sheet metal and are assembled into the assembly;
saving attachment data defining attachment relationships among the parts;
saving edit data defining edit states of the parts; and
saving assembling data defining an assembling sequence of the parts.

38. The computer readable medium of claim 37, wherein the attachment data includes at least one of distance data, angle data, and connection data concerning the parts.

39. The computer readable medium of claim 37, wherein the edit data includes at least one of connection-hole position data and connection-hole shape data concerning the parts.

40. The computer readable medium of claim 37, wherein the parts include single parts and components, each component being made of a plurality of single parts.

41. The computer readable medium of claim 40, wherein the assembling data includes data to assemble a component from single parts.

42. The computer readable medium of claim 37, wherein the software further comprising:
saving attribute data defining attributes of the parts.

43. The computer readable medium of claim 42, wherein the attribute data includes data defining colors of the parts.

44. A computer readable medium containing software of editing an assembly with CAD, wherein the software comprising:
selecting, through navigation, a first element of a first part among parts displayed on a CAD screen, the parts being made of sheet metal and being assembled into the assembly, the navigation automatically selecting an element of a part under a cursor as the cursor is moved on the CAD screen; and
dragging the first part including the first element with the cursor in one of horizontal and perpendicular directions relative to the first element.

45. The computer readable medium of claim 44, wherein the parts include single parts and components, each component being made of a plurality of single parts.

46. The computer readable medium of claim 44, wherein the first element includes one of a line or a face.

47. The computer readable medium of claim 46, wherein the software comprising:
rotating the first part around the first element.

48. The computer readable medium of claim 47, wherein the software comprising:
rotating the first part around a line or a normal to a face of the first part.

49. The computer readable medium of claim 44, wherein the software comprising:
flipping the first part relative to the first element.

50. The computer readable medium of claim 44, wherein the software further comprising:
selecting, through navigation, a second element of a second part among the parts displayed on the CAD screen; and
attaching the first element of the first part to the second element of the second part.

51. The computer readable medium of claim 50, wherein the second element includes one of a line or a face.

52. The computer readable medium of claim 51, wherein the first and second elements are faces, respectively.

53. The computer readable medium of claim 50, the software further comprising:
setting an attaching state of the first and second elements.

54. The computer readable medium of claim 53, wherein the operation of setting an attaching state sets at least one of the distance, angle, and connection of the first and second parts.

55. The computer readable medium of claim 53, wherein the operation of setting an attaching state displays a dialog window and is carried out through the dialog window.

56. A computer readable medium containing software of editing an assembly with CAD, wherein the software comprising:
selecting a first part in which a connection hole is formed among parts that are made of sheet metal and are assembled into the assembly;
selecting a first face from the first part and setting a type of the connection hole to be formed in the first face;
setting a location of the connection hole on the first face; and finding a second face of a second part corresponding to the first face.

57. The computer readable medium of claim 56, wherein the operation of setting a type of the connection hole includes choosing a type of the connection hole from a group including burring and tapping.

58. The computer readable medium of claim 56, wherein the operations of setting the type and location of the connection hole display a dialog window and are carried out through the dialog window.

* * * * *